United States Patent [19]
Prentice

[11] Patent Number: 5,745,563
[45] Date of Patent: Apr. 28, 1998

[54] TELEPHONE SUBSCRIBER LINE CIRCUIT, COMPONENTS AND METHODS

[75] Inventor: John S. Prentice, Palm Bay, Fla.

[73] Assignee: Harris Corporation, Melbourne, Fla.

[21] Appl. No.: 840,547

[22] Filed: Feb. 25, 1992

[51] Int. Cl.$^6$ ................................................ H04M 1/00
[52] U.S. Cl. ..................... 379/399; 379/385; 379/413; 323/311; 307/112
[58] Field of Search ................... 379/382–385, 379/399, 418, 413; 307/253–260, 296.1, 296.6; 323/34, 312, 311; 361/18, 111

[56] References Cited

U.S. PATENT DOCUMENTS

| | | | |
|---|---|---|---|
| 2,965,769 | 12/1960 | Bell | 307/253 |
| 3,515,906 | 6/1970 | Geller | 307/255 |
| 3,697,772 | 10/1972 | Gibbs | 307/254 |
| 3,711,728 | 1/1973 | Villella et al. | 307/254 |
| 3,719,833 | 3/1973 | Free | 307/255 |
| 3,748,497 | 7/1973 | Woods | 307/255 |
| 3,980,900 | 9/1976 | Ishigaki et al. | 307/254 |
| 4,031,432 | 6/1977 | Proctor | 361/100 |
| 4,085,342 | 4/1978 | Parkyn | 307/260 |
| 4,125,787 | 11/1978 | Onhinata et al. | 307/253 |
| 4,203,043 | 5/1980 | Katakura | 307/254 |
| 4,631,362 | 12/1986 | Arntsen et al. | 379/384 |
| 4,712,233 | 12/1987 | Kuo | 379/399 |
| 4,827,505 | 5/1989 | Takato et al. | 379/385 |
| 4,945,259 | 7/1990 | Anderson | 307/296.6 |
| 5,155,394 | 10/1992 | Szepesi | 307/296.6 |
| 5,175,489 | 12/1992 | Mizuida | 323/312 |
| 5,214,329 | 5/1993 | Furino, Jr. | 330/261 |
| 5,237,211 | 8/1993 | Tanaka et al. | 379/413 |
| 5,270,569 | 12/1993 | Beasom | 257/506 |

OTHER PUBLICATIONS

"Audio Cyclopedia", Howard M. Tremaine, Second Edition, Second Printing 1973, p. 589.
"IBM Technical Disclosure Bulletin" vol. 7, No.10, Mar. 1965 p. 874 Precision Current Source Independent of Supply Voltage.

*Primary Examiner*—James L. Dwyer
*Assistant Examiner*—Scott L. Weaver
*Attorney, Agent, or Firm*—Rogers & Killeen

[57] ABSTRACT

A subscriber line circuit for a telephone network having current controlled switches and current sources. Methods of making and using the components are also disclosed.

85 Claims, 17 Drawing Sheets

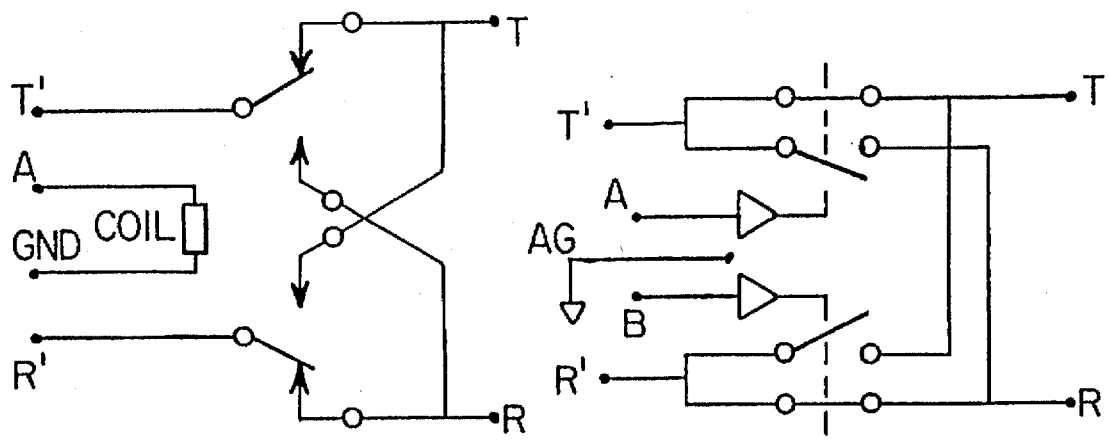
FIG. 4
(PRIOR ART)
FIG. 5
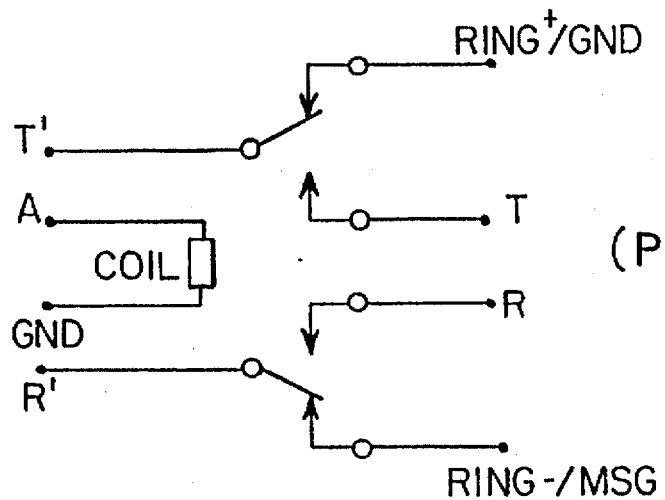
FIG. 6
(PRIOR ART)
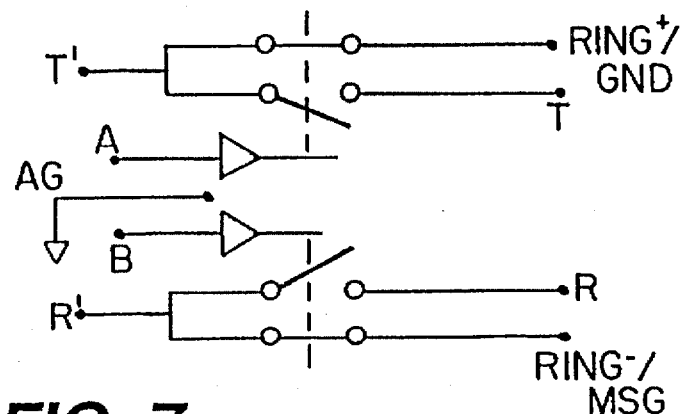
FIG. 7

FIG. 31
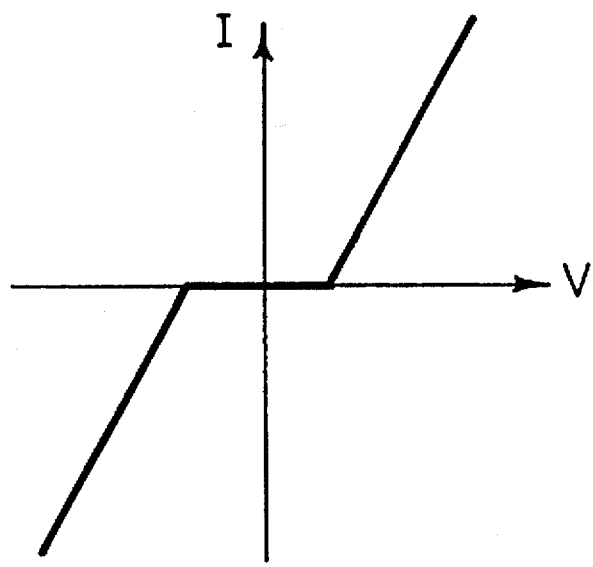
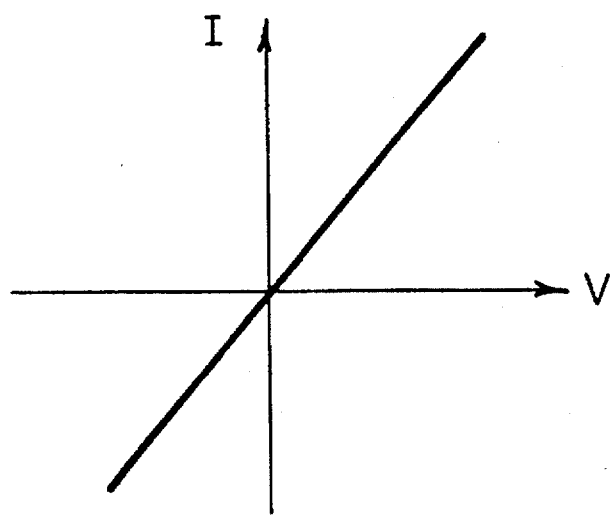
FIG. 32

TELEPHONE SUBSCRIBER LINE CIRCUIT, COMPONENTS AND METHODS

INTRODUCTION

The present invention relates to telephone networks and more particularly to a subscriber line circuit or card by which the central office or private branch exchange interfaces with the pair of telephone lines leading to the individual subscriber.

Many aspects of the circuit are novel, including without limitation several embodiments of discrete and integrated circuit components and the methods by which they are manufactured, integrated with other components and operated. These aspects, and others, are described in the following specification, organized for ease in understanding as follows:

TABLE OF CONTENTS

Section 1—Subscriber Line Circuits
Section 2—Current Controlled Switch Cells
Section 3—Integrated Circuit Switch Cells
Section 4—High Voltage Current Sources
Section 5—Advantages and Scope of Invention

SECTION 1—SUBSCRIBER LINE CIRCUITS

BACKGROUND

The present invention relates to telephone networks of the type illustrated in FIG. 101 as including two central offices 110 connected by a digital transmission network 112. Each of the central offices may be connected through a private branch exchange ("PBX") 114 to the subscriber telephones 116 or connected directly to the subscriber telephones 118.

With reference to FIGS. 102 and 103, a telephone subscriber, typically a single telephone line, is connected to the lines leading to other subscribers by means of a subscriber line circuit 120 as shown in FIGS. 102 and 103 that may include various components depending on whether the connection is to be made through a PBX (FIG. 103) or directly through a central office (FIG. 102).

The arrangement and functions of the various components typically included in the subscriber line circuit 120 are well known. For connection through a central office as shown in FIG. 102, the components typically included are a test relay 122 for providing an access to test the circuitry that effects telephone service, a ring relay 124 for allowing activation of the telephone subscriber's ring circuit, a reversal relay 126 for providing a signal (i.e., a polarity reversal) to the subscriber's line for a particular purpose such as a coin return for a pay telephone or to distinguish between two subscribers on the same shared line, and a subscriber line interface circuit ("SLIC") 128 for establishing the connection to the subscriber's line pair at the central office 110. Note that the position of the test relay 122 and the ring relay 124 may be reversed as a function of the desirability of reversing the polarity of the "ring" signal.

As illustrated in FIG. 103, for connection through a PBX 114, the test relay 122 and the reversal relay 126 are typically not needed and are deleted from the circuit 120.

Typically, each of the components 122–128 conduct both "ring" signals and voice signals through a matrix of switches. Each of the components 122–128 are desirably small so that tens or hundreds may be mounted on a single printed circuit board. Both the "ring" and voice signals are analog signals, with the "ring" signal having a high voltage (generally between 100 and 200 volts and may be higher) and narrow bandwidth, and with the voice signal having a relatively low voltage and a substantial bandwidth at least the range of the human voice. Switches must therefore be capable of withstanding the high voltage without distortion of the low voltage voice signals. Despite the desire for small size, the aforementioned high voltage and wide bandwidth have mandated the use of space-consuming and frequently trouble-prone electromechanical switching devices or relays.

In addition, it is highly desirable that telephone circuits use switches which are bidirectional so as to avoid duplication required for unidirectional operation. Electromechanical relays are bidirectional in operation, but are trouble prone and large in size.

As is well known, electromechanical relays are controlled by the current in the relay coil, a current which is isolated from the current passing through the switch. However, the amount of control current is generally relatively large compared to the current passing through the switch, and hence the relays have a small gain and consume relatively large amounts of power.

Integrated circuits provide an opportunity to meet the demands for small size, but have not been able to meet the functional requirements for telephone circuitry, especially in the areas of high voltage blocking capability and low signal distortion over the requisite bandwidth; the former being operationally translated as a requirement for switches with a high gain (the ratio of maximum switch current to switch biasing current) and the latter being operationally translated as a requirement for switches with a linear impedance (resistance as a practical matter) over a wide range of input signals and a zero offset i.e., continued linearity through the zero-zero crossing on the I/V response curve. The use of MOSFET's, for example, while solid state, requires a relatively large area to implement the circuits described herein.

MOSFET's have the additional disadvantage, as do SCR's, of being unidirectional devices which must be operated in pairs to achieve bidirectional operation.

Further, it is desirable that the switches use common elements, or are identical so that increased integration of the subscriber line card may be achieved with resulting space and manufacturing cost savings. In addition, identical switch elements having the same impedance make it possible for the condition of the circuit to be ascertained through impedance checks.

It is known, for example in the United States to integrate the reversal circuit 126 of FIG. 102 with the SLIC 128. It is further known in Japan, but only with unidirectional SCR switches, to integrate the test relay 122, ring relay 124, reversal relay 126 and SLIC 128 of FIG. 102 on a single card or circuit board. While acceptable for ring relays, the use of SCR switches has been unacceptable in the United States for test relays and reversal relays due to the asymmetrical response or offset. In addition, SCR's are often difficult to turn off once conducting.

Accordingly, it is an object of the present invention to provide a novel telephone subscriber line circuit capable of withstanding the voltage of the relatively high voltage, narrow bandwidth "ring" signal without unacceptable distortion of the relatively low voltage, wide bandwidth voice signal and which obviates the problems of the known prior art.

It is another object of the present invention to provide a novel telephone subscriber line circuit which is current controlled.

Another object of the present invention is to provide a novel telephone subscriber line circuit which is analog, bidirectional with zero offset in its switching.

Yet another object of the present invention is to provide a novel telephone subscriber line circuit using semiconductor integrated circuits.

A further object of the present invention is to provide a novel telephone subscriber line circuit with greatly enhanced integration of the various component relays.

Still a further object of the present invention is to provide a novel telephone line circuit with significantly reduced impedance. As is well known, the power to operate a subscriber telephone is derived from a battery at the exchange, and any reduction in the power dissipated in each of the many switches in the circuit may be significant to the operation of the telephone system.

BRIEF DESCRIPTION OF THE DRAWINGS

FIG. 4 (hereinafter FIG. 104) is a schematic circuit diagram of a known reversal relay of the prior art.

FIG. 5 (hereinafter FIG. 105) is a schematic circuit diagram of a reversal relay configured in accordance with the present invention.

FIG. 6 (hereinafter FIG. 106) is a schematic circuit diagram of a known ring relay.

FIG. 7 (hereinafter FIG. 107) is a schematic circuit diagram of a ring relay of configured in accordance with the present invention.

DESCRIPTION OF EXEMPLARY EMBODIMENTS

Figure 1:
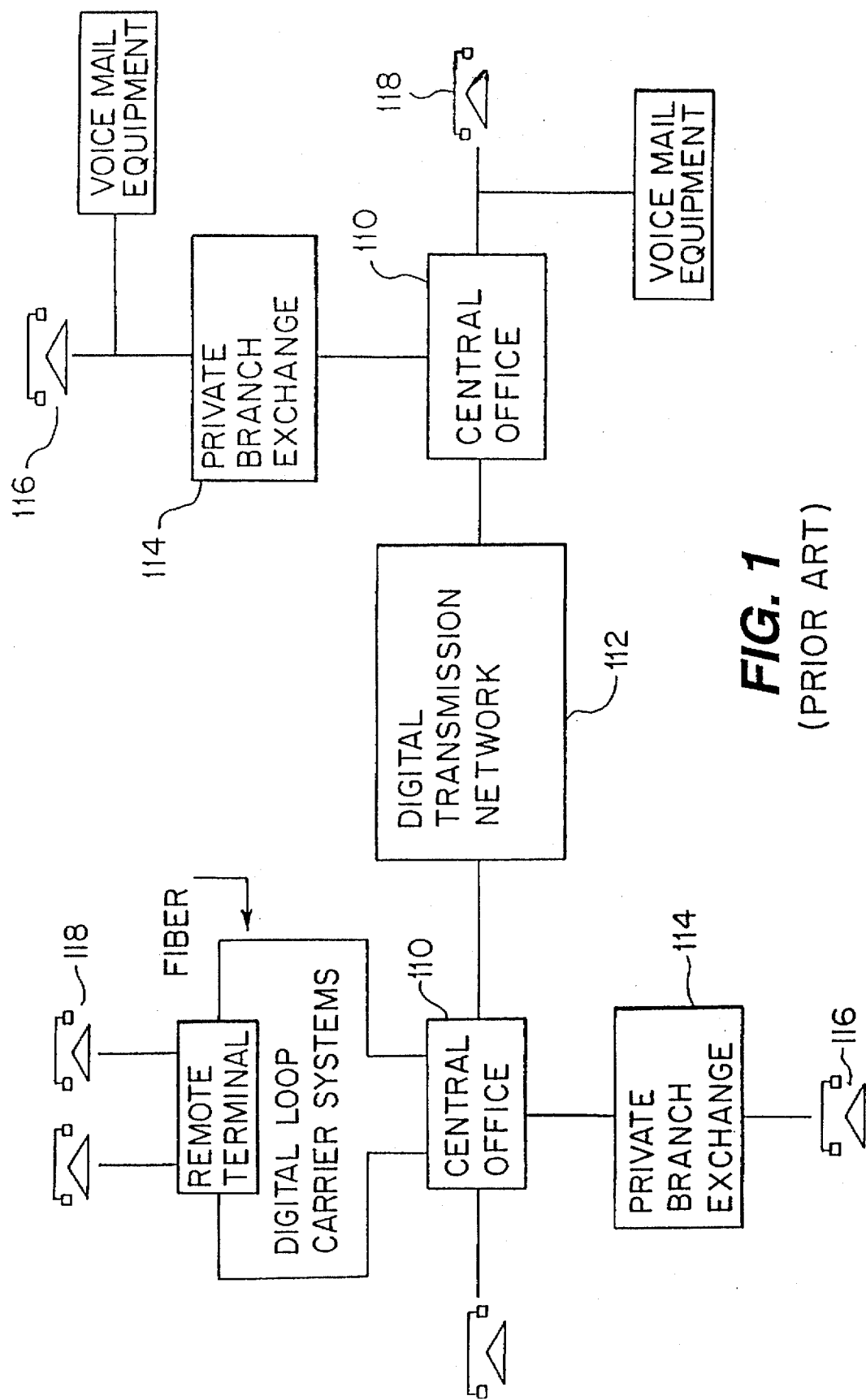
FIG. 1 (hereinafter FIG. 101) is a schematic diagram illustrating a typical prior art telephone system.
Figure 2:
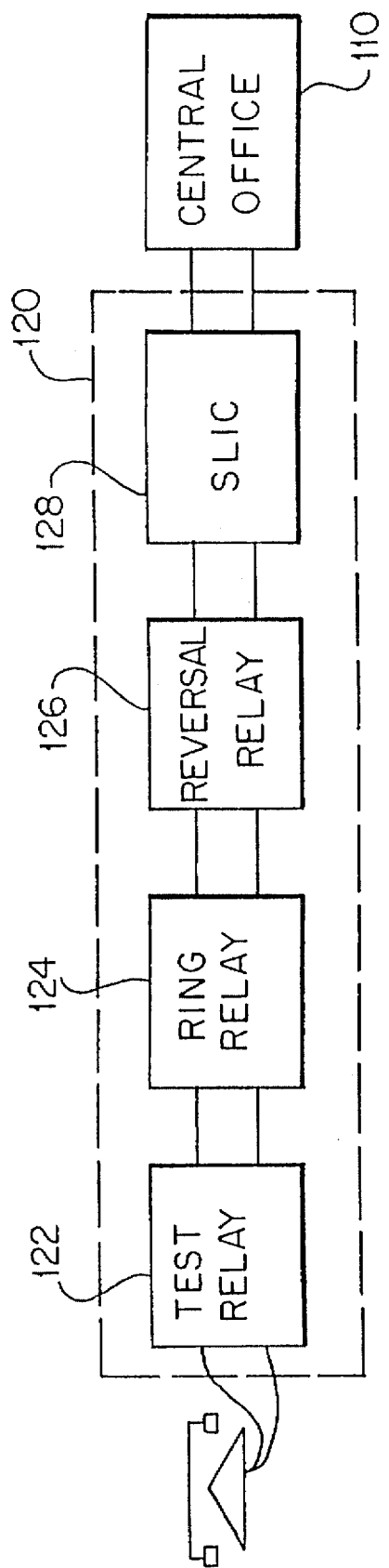
FIG. 2 (hereinafter FIG. 102) is a schematic diagram of elements of a known central office subscriber line circuit.
Figure 3:
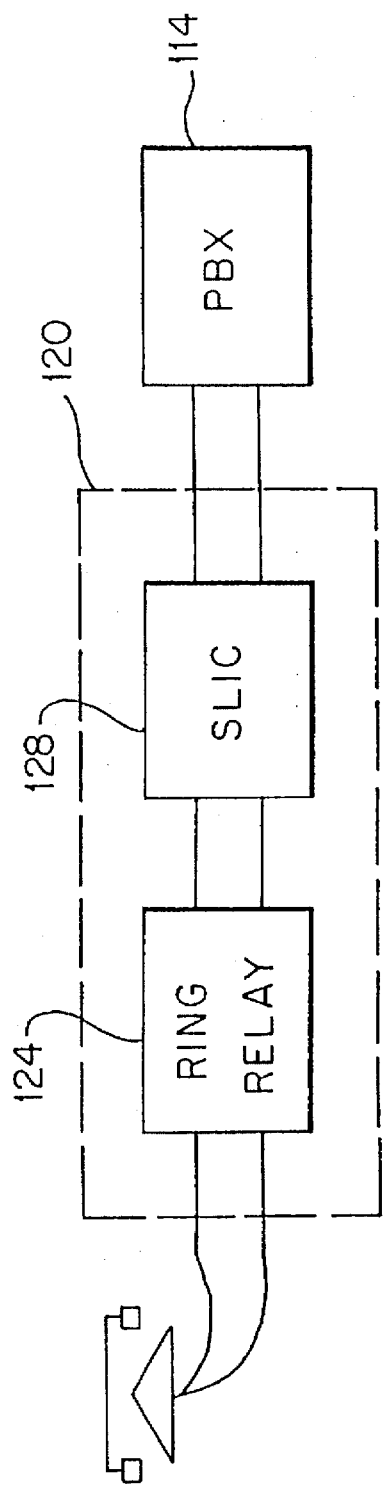
FIG. 3 (hereinafter FIG. 103) is a schematic diagram of elements of a known PBX subscriber line circuit.
Figure 8:
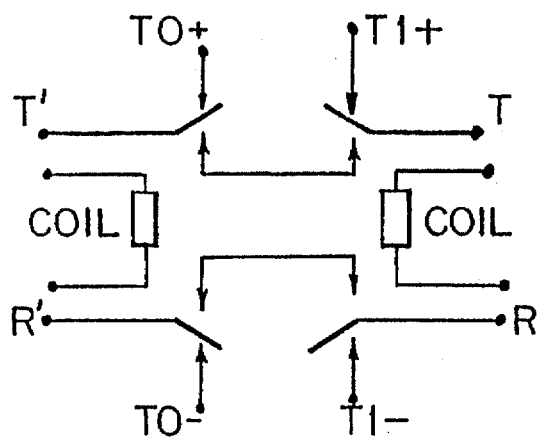
FIG. 8 (hereinafter FIG. 108) is a schematic circuit diagram of a known test relay.
Figure 9:
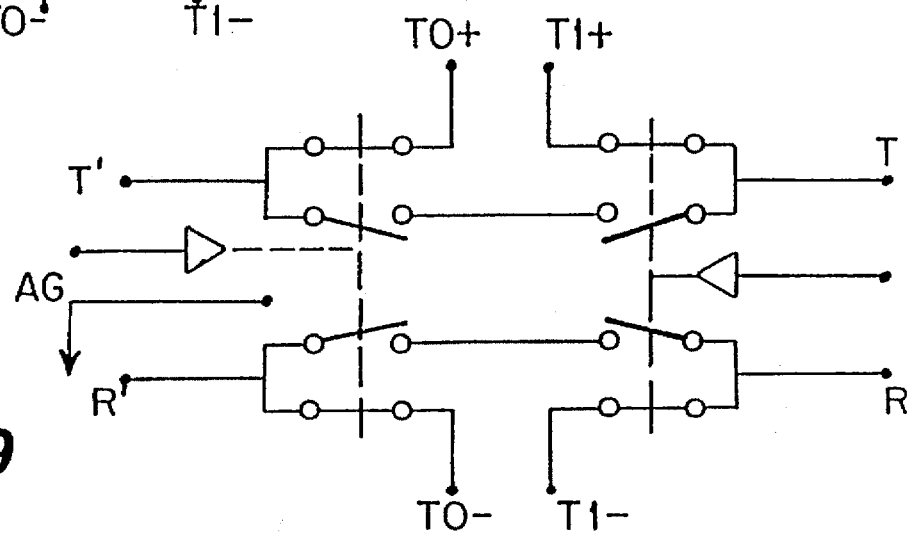
FIG. 9 (hereinafter FIG. 109) is a schematic circuit diagram of a test relay configured in accordance with the present invention.
Figure 12:
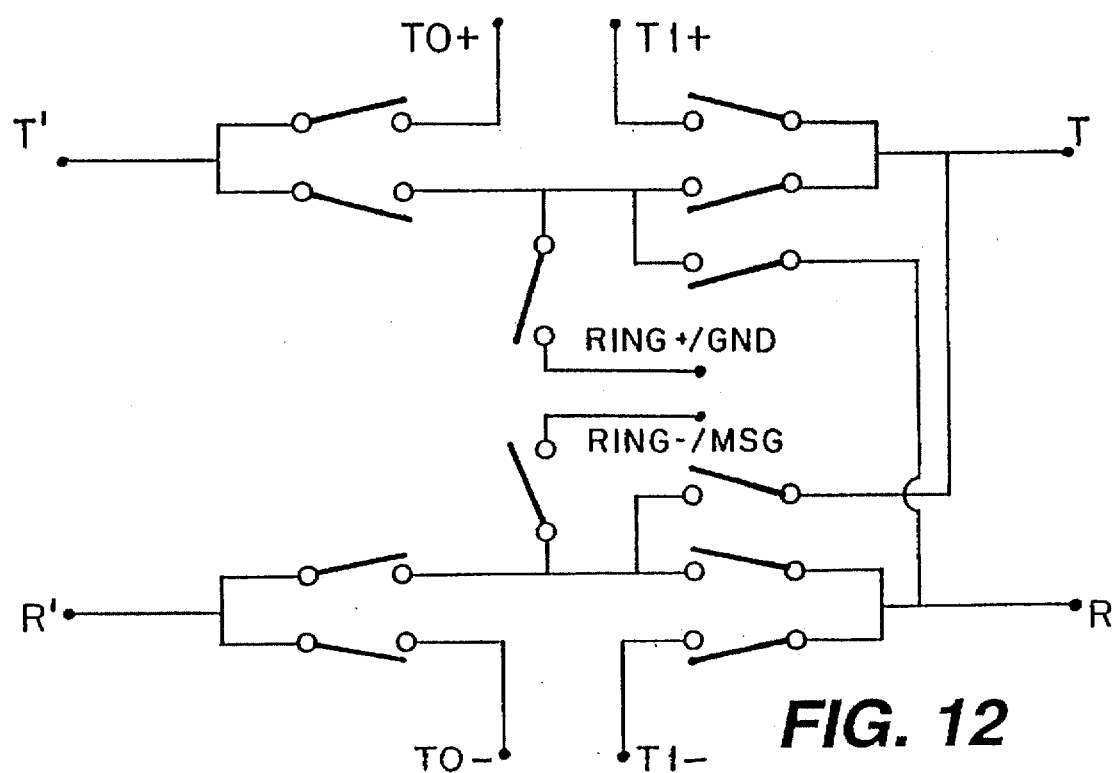
FIG. 12 (hereinafter FIG. 112) is a schematic circuit diagram of the subscriber line circuit of the present invention implemented with 12 switches.
Figure 10:
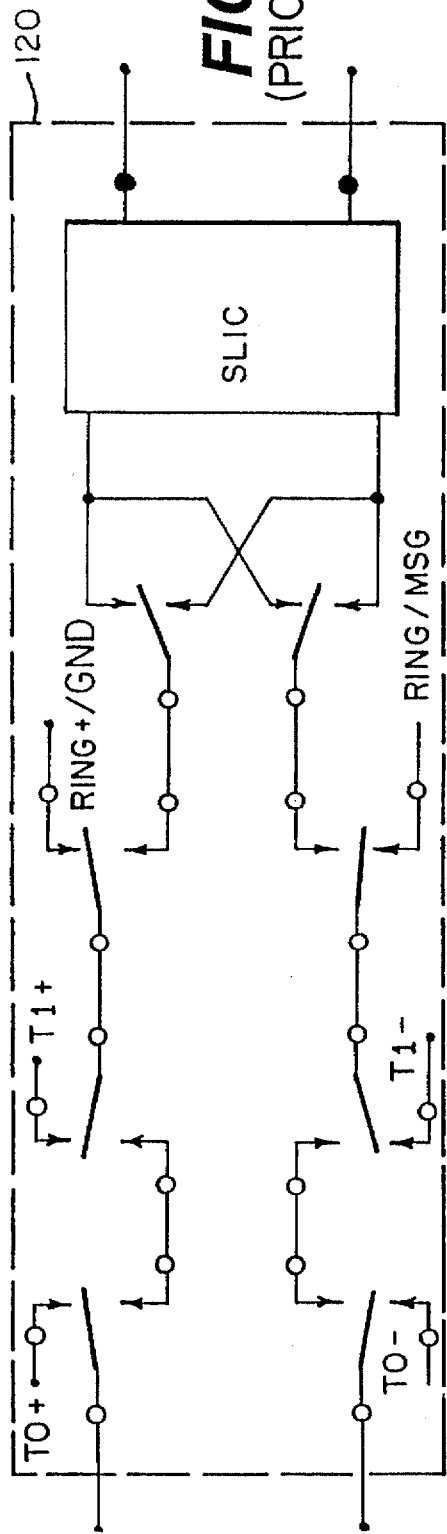
FIG. 10 (hereinafter FIG. 110) is a schematic circuit diagram of the subscriber line interface circuit of FIG. 102 incorporating the conventional test relay, ring relay and reversal relays of FIGS. 104, 106 and 108.
Figure 11:
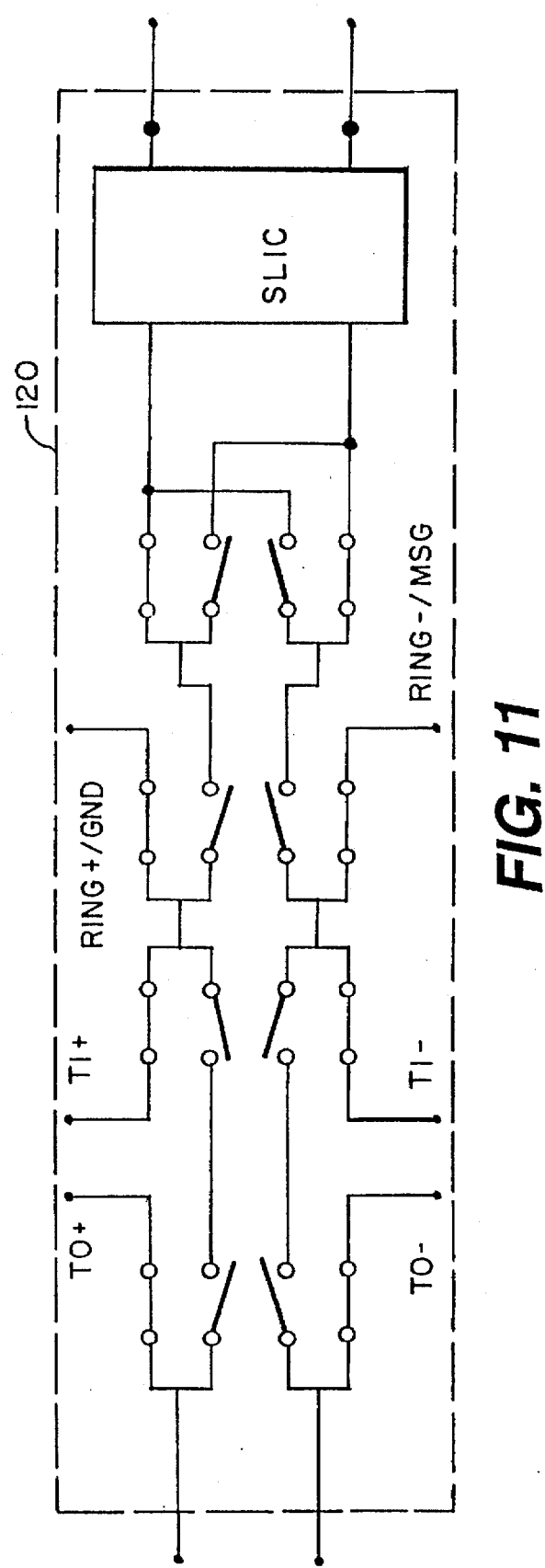
FIG. 11 (hereinafter FIG. 111) is a schematic circuit diagram of the subscriber line circuit of the present invention equivalent to the circuit of FIG. 110 implemented with 16 switches.
Figure 13:
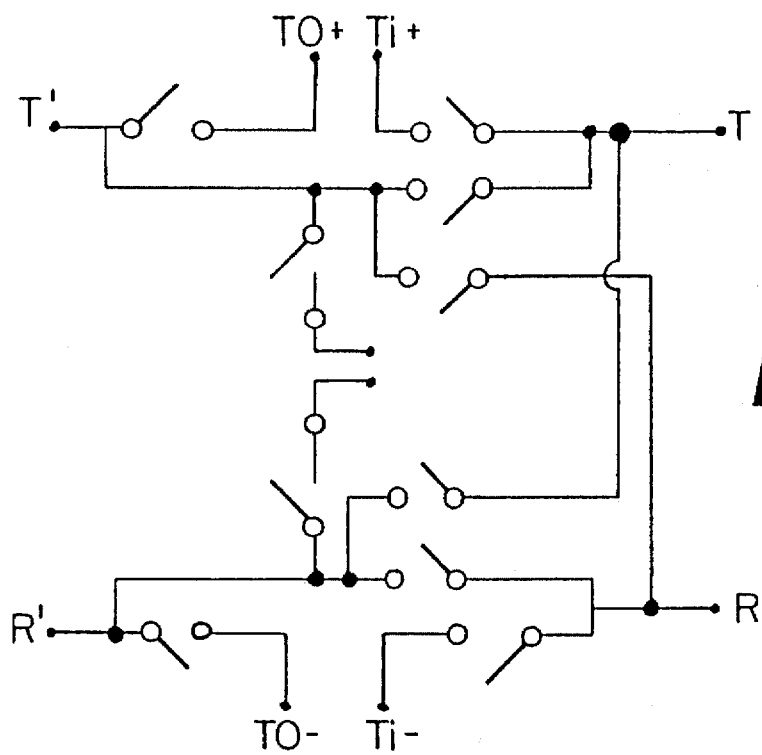
FIG. 13 (hereinafter FIG. 113) is a schematic circuit diagram of the subscriber line circuit of the present invention implemented with 10 switches.

With reference now to FIG. 104 where the prior art reversal relay 126 of FIGS. 102 and 103 is schematically illustrated, the reversal relay includes two single pole, double throw, ("SPDT") switches whereby the tip ("T") and ring ("R") lines may be reversed insofar on their application to the T' and R' terminals of the ring relay 124. Note that the single relay coil illustrated may be used to operate pairs of switches in a double pole, double throw ("DPDT") configuration.

The circuit of FIG. 104 may be functionally implemented by the circuit of FIG. 105 using four single pole, single throw ("SPST") current controlled switches of the present invention. As is readily apparent, the SPST switches may be used in pairs and function as a single pole, double throw ("SPDT") or double pole, single throw ("DPST") switch when controlled by the same current source.

Similarly, a known relay implementation of the ring relay 24 of FIGS. 102 and 103 is illustrated in FIG. 106, again using two SPDT switches. The functionally equivalent circuit of the present invention is illustrated in FIG. 107, again using four SPST switches which may be controlled by the same current source.

The conventional electromechanical relay implementation of the test relay 122 of FIG. 102 is shown in FIG. 108 using four SPDT switches. The functional equivalent of the test relay using switches of the present invention is illustrated in FIG. 109 using eight SPST current controlled switches.

The subscriber line card 120 of FIG. 102, implemented by the electromechanical relay circuits of FIGS. 104, 106 and 108, is illustrated in FIG. 110 with eight conventional SPDT relays. The same functional circuit as illustrated in FIG. 111 requires sixteen SPST switches, or only eight of the equivalent DPST switches.

A reduction in the number of switches is illustrated in FIG. 112 where the equivalent circuit requires only twelve of the SPST switches of the present invention. A still further reduction is illustrated in FIG. 113 where the equivalent circuit is implemented by only 10 of the SPST switches of the present invention. The reduction in the number of switches is significant, as is the reduction in the cost of the switches themselves.

From the foregoing, it is apparent that a substantial increase in the integration of the components of the subscriber line card is possible using the novel, current controlled switches of the present invention. When the switches are implemented by integrated circuits ("ICs"), they may be inexpensively ganged onto the same circuit boards in various combinations not heretofore possible using known technology. By way of example, four SPST switches nay be combined into a single IC to function as a pair of SPDT switches. Similarly, eight SPST switches may be combined into a single IC to function as the combination of the ring relay and reversal relay. Likewise, ten of the SPST switches of the present invention may be combined into a single IC to function as the combination of the ring relay, reversal relay and test relay. Alternatively, twelve of the SPST switches of the present invention may be combined into a single IC to function as the combination of the test relay and ring relay, or combined into a single IC as the combination of test relay, ring relay and reversal relay. Other combinations are of course possible and it is to be understood, for example, that a message waiting relay may be substituted for the reversal relay in all of the foregoing circuits, or that a ground start relay may be used.

SECTION 2—CURRENT CONTROLLED SWITCH CELLS

In another aspect, the present invention relates generally to analog, bidirectional switch cells which have particular utility in the subscriber line circuit described in the foregoing Section 1. However, the various embodiments of the analog bidirectional switch cell of the present invention have application in a myriad of other circuits, and may be considered a variable resistor.

Low voltage, discrete component, bipolar junction transistor, bidirectional analog signal switches are known in the prior art. With reference to the prior art circuit shown in FIG. 201, discrete NPN Transistors Q1 and Q2 have been connected in a common emitter configuration with the collectors serving as the switch terminals S1 and S2 and with current sources I1 and I2 connected between the base and emitter of the transistors Q1 and Q2, respectively, to control the conduction thereof. In operation, the conduction of the transistors Q1 and Q2 is controlled by the base-to-emitter bias supplied by the current sources I1 and I2. See, for example, "Chopper Transistors", Sperry Applications Engineering Department, November, 1960.

To enable the switch to operate without offset (i.e., with a symmetric I/V curve passing through the origin), the transistors Q1 and Q2 must be well matched, as must the two current sources I1 and I2. The switch is able to block voltages only up to the $BV_{CES}$ of the transistor connected to the more positive switch terminal and in known switches is generally limited to 40 volts, and occasionally 60 volts, by transistor manufacturing techniques.

The current sources I1 and I2 may float with the voltage across the switch terminals S1 and S2. As is known, current sources I1 and I2 inject excess carriers into the transistors Q1 and Q2, forward biasing both emitter-base and collector-base junctions. The excess carrier concentration builds up until the recombination current exactly equals the current source current. Since the current sources I1 and I2 introduce as much current at the base of the transistors Q1 and Q2 as they remove from the emitters of the transistors Q1 and Q2, they add no offset current to the switch, and known transistors are operated in saturation to keep the switch impedance low and linear.

If the switch terminal S1 is more positive than the switch terminal S2, switch current will flow in the direction shown in the drawings and may be one to two orders of magnitude larger than the current sources I1 and I2. As is apparent, transistor Q2 operates in the reverse direction, i.e., with switch current coming out of the collector instead of going in the collector. As is known, the transistor operating in the reverse direction requires more bias current than the forward operating transistor for a given switch current because $\beta_R$ is less than $\beta_F$. Switch I/V characteristics are linear up to a given level of switch current indicated as A on the graph of FIG. 204.

With reference now to FIG. 202, the known prior art appears to include a single voltage source V, instead of the two current sources I1 and I2. The use of a single voltage source is advantageous in that the onerous requirement to match current sources is obviated, although symmetrical operation still depends on the matching of circuit components.

As shown in FIG. 202, the voltage source V may be connected to the bases of the transistor Q1 and Q2 by resistors 210 and 212. The known prior art does not disclose the reasons for the use of a voltage source and resistors, but it may be that the use of a voltage source with sufficiently high values of resistance is intended to be a way of creating a single current source. In any event, it is apparent that this circuit requires more total base current for a given switch resistance. Moreover, the resistors must be closely matched to each other for symmetrical switch operation. Finally, resistance values must also be closely matched to a predetermined absolute value because values that are too high or too low either reduce the range of linearity of the switch or provide insufficient biasing current. For a given pair of transistors Q1 and Q2, an optimal resistance value exists for resistors 210 and 212. The necessity to determine that optimal value and to provide specifically matched resistors is a disadvantage of the prior art circuits shown in FIG. 202.

Moreover, the bidirectional circuits of the prior art do not increase the conduction inducing bias at the transistor operating in reverse relative to the conduction inducing bias at the forward operating transistor.

Accordingly, it is an object of the present invention to provide a novel analog, bidirectional switch.

Another object of the present invention is to provide a novel switch which is capable of withstanding high voltage.

Another object of the present invention is to provide a novel switch which is dynamically responsive to the current or voltage applied to the switch.

Another object of the present invention is to provide a novel switch which may be implemented in a common collector configuration for low voltage operation.

Another object of the present invention is to provide a novel switch which may be used as a variable resistor in non-switch application such as wave shaping or gain control.

Another object of the present invention is to provide a novel switch which is current controlled, and in which the control current may be derived in part from the switch current.

Another object of the present invention is to provide a novel switch which may be implemented in parallel with opposite conductivity transistors to increase the gain and reduce power consumption.

It is yet a further object of the present invention to provide a novel switch having high gain.

It is yet a further object of the present invention to provide a novel switch having a linear voltage output over a wide range of input currents.

Still additional objects include novel methods of increasing switch gain, the range of linearity, and reducing voice signal distortion.

These and many other objects and advantages will be readily apparent from the following detailed description of exemplary embodiments.

BRIEF DESCRIPTION OF THE DRAWINGS

Figure 14:
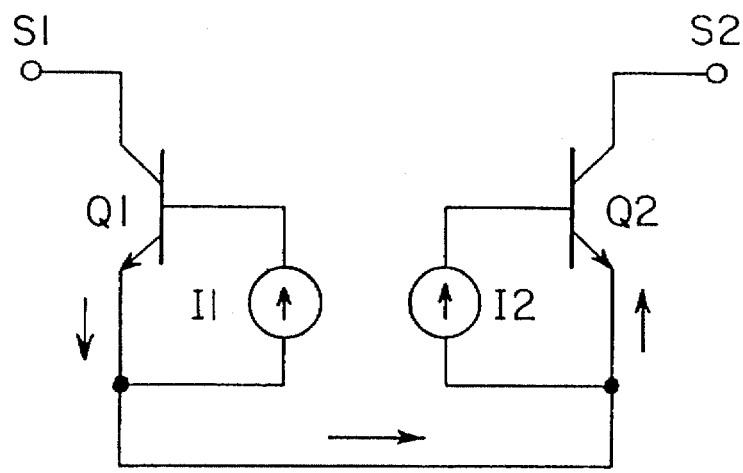

FIG. 14 (hereinafter FIG. 201) is a schematic diagram of a low voltage, discrete component switch of the prior art with two current sources.

Figure 15:
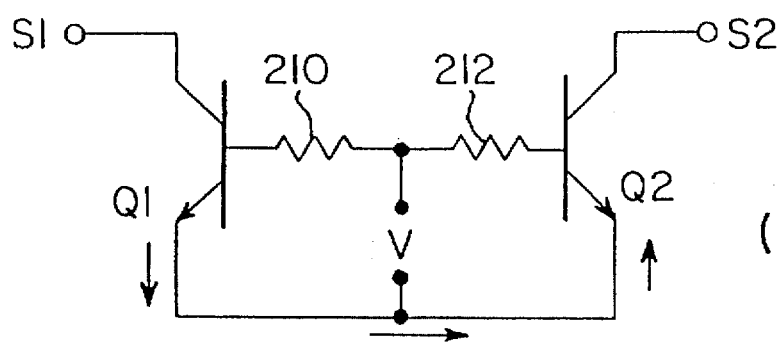

FIG. 15 (hereinafter FIG. 202) is believed to be a schematic diagram of a low voltage, discrete component switch of the prior art with a single voltage source.

Figure 16:
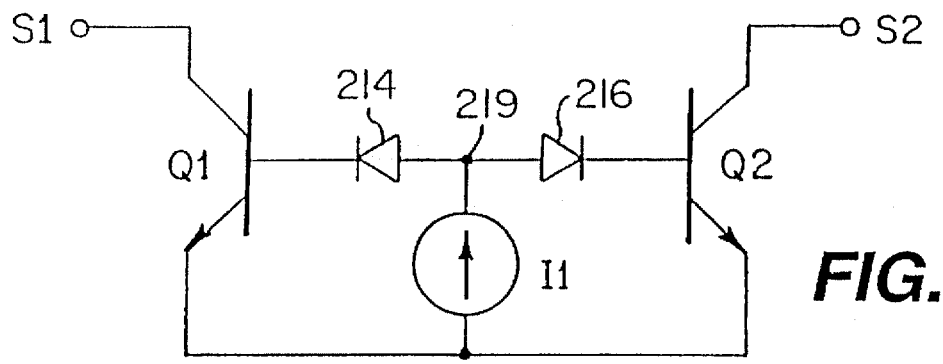

FIG. 16 (hereinafter FIG. 203) is schematic diagram of a first embodiment of the high voltage discrete component switch of the present invention.

Figure 17:
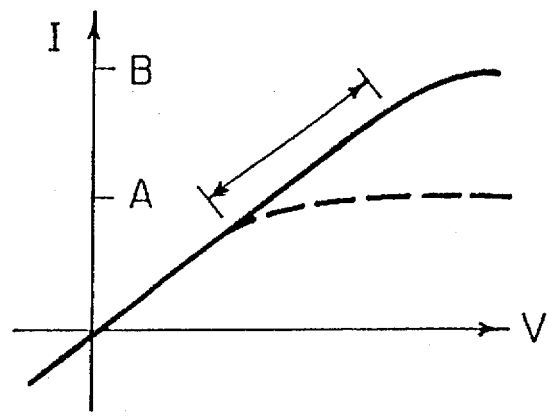

FIG. 17 (hereinafter FIG. 204) is a graph showing the increased range of linearity in the I/V response of the switch of FIG. 203.

Figure 18:
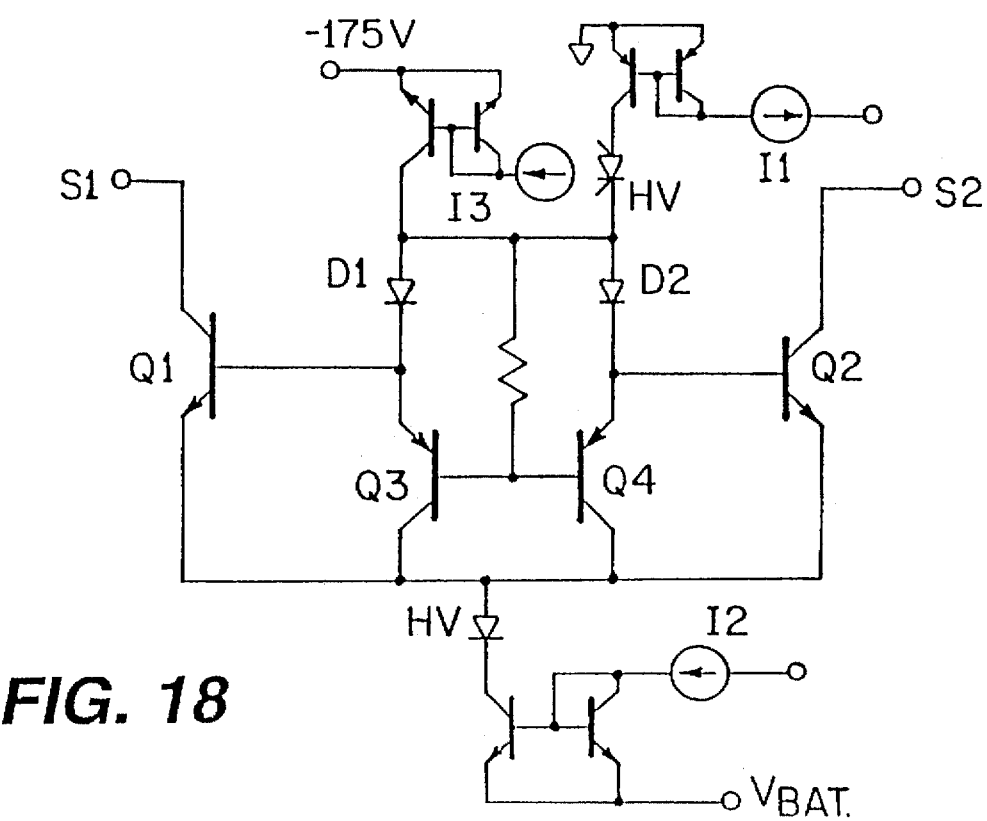

FIG. 18 (hereinafter FIG. 205) is a schematic diagram of the switch of the invention of FIG. 203 with a high voltage bias circuit.

Figure 19:
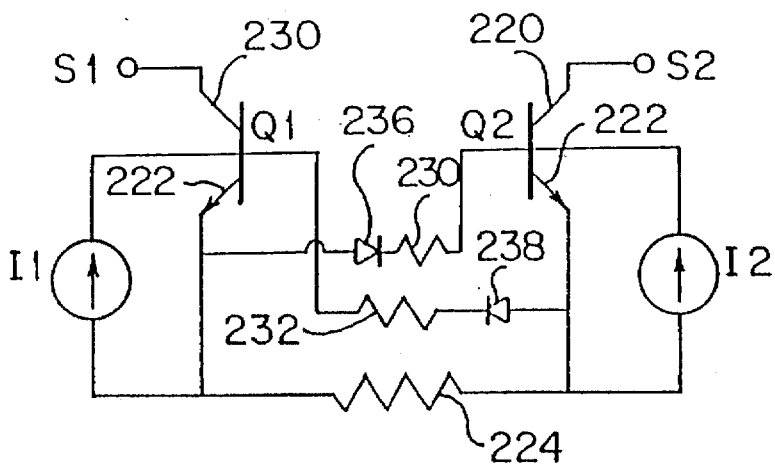

FIG. 19 (hereinafter FIG. 206) is a schematic diagram of a second embodiment of the high gain switch circuit of the present invention.

Figure 20:
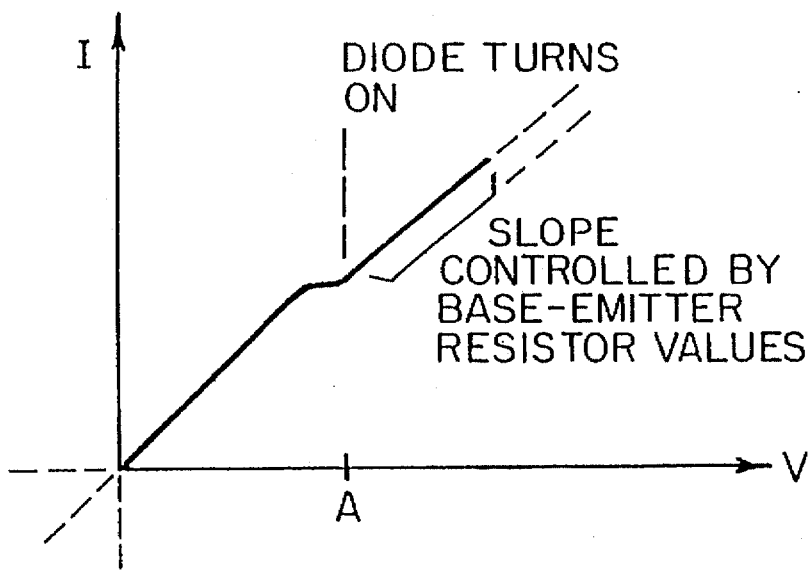

FIG. 20 (hereinafter FIG. 207) is a graph showing general I/V response in the low voltage and high voltage regions of operation of the high gain switch of FIG. 206.

Figure 21:
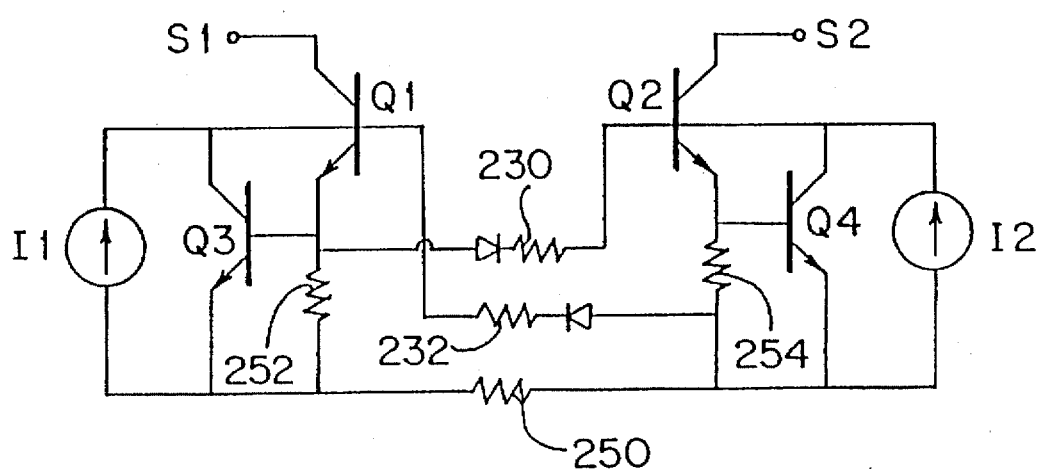

FIG. 21 (hereinafter FIG. 208) is a schematic diagram of an embodiment of the high voltage switch of FIG. 206 illustrating a switch with reduced resistance.

Figure 22:
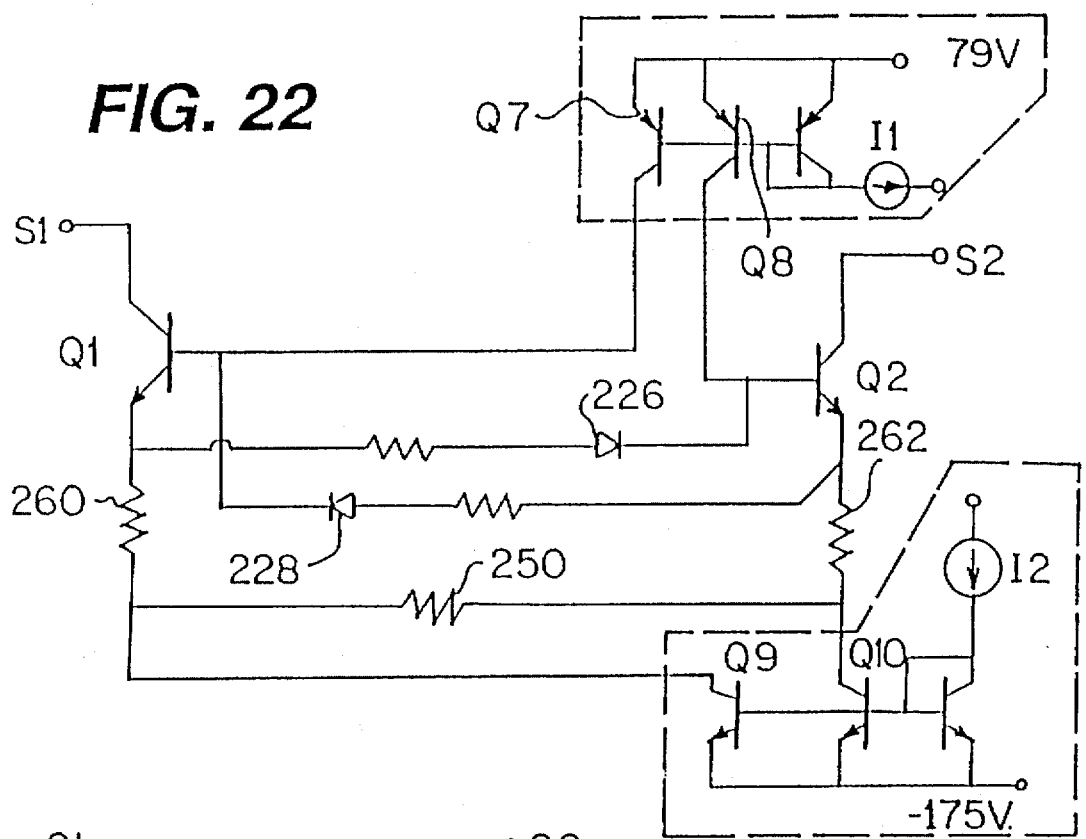

FIG. 22 (hereinafter FIG. 209) is a schematic diagram of the switch of FIG. 206 with a high voltage bias circuit.

DESCRIPTION OF EXEMPLARY EMBODIMENTS

With reference now to FIG. 203, one embodiment of the switch of the present invention includes a single current source and replaces the resistors 210 and 212 of the circuit of FIG. 202 with either non-resistive or non-linear current limiters 214 and 216. While diodes are illustrated in FIG. 203, other types of limiters, such as BJTs, may also be used. As hereinafter used in the specification and claims, the term "current limiters" will exclude purely linear resistors. As will be discussed below, the use of limiters provides significant manufacturing and operating advantages in that the limiters 214 and 216 do not have to be closely matched to each other, or to any predetermined value.

With further reference to FIG. 203, one of the transistors Q1 and Q2 operates in the reverse mode when the switch is on. To accommodate the increased bias current requirement for the transistor operating in the reverse direction, the current from I1 is unequally allocated to the bases of Q1 and Q2 by the limiters 214 and 216. By so doing, the gain of the switch is increased. Further, because of the differential biasing of the transistors Q1 and Q2 and the resultant increase in the maximum switch current, the range of linearity of the switch is increased from point A to point B as illustrated in FIG. 204. If the range of linearity is acceptable, the increased gain permits a reduction in the amount of control current necessary to operate the switch and therefore reduced power requirements.

With the switch terminal S1 more positive than the switch terminal S2, there is a higher voltage at the base of Q1 than at the base of Q2, so that the cathode of the diode 214 is more positive then the cathode of the diode 216. Since the voltage at the common anodes of the diodes 214 and 216 is the same, limiter 214 is less forward biased than limiter 216, so that more bias current is applied through current limiter 216 to the base of the reverse operating transistor Q2. As the potential difference between the two switch terminals S1 and S2 increases, a higher percentage of the current from the current source I1 flows through the current limiter 216.

In other words, the switch responds dynamically to the changing switch current by increasing the base current at the reverse operating transistor relative to the base current at the forward operating transistor, and does so without regard to the direction of current flow. The limiters 214 and 216 need not be precisely matched to each other or to a particular value for the differential biasing of the two transistors.

A second embodiment of the switch of FIG. 203 that may find application in a high voltage telephone circuit is illustrated in FIG. 205. As may be seen from a comparison of the circuits of FIG. 203 and FIG. 205, the diodes and the current source may require more complex circuitry in a specific implementation which performs the same general function.

In FIG. 205, high voltage transistors Q1 and Q2 are shown emitter coupled and are biased into saturation by a current source I1. Current source I2 may be matched to I1 to eliminate any offset current caused by control current flowing though the switch terminals S1 and S2. Diodes D1 and D2 steer a larger percentage of the bias current from sources I1 and I2 into the transistor operating in the reverse mode (i.e. transistor Q2 when switch terminal S1 is more positive than switch terminal S2). This increases the maximum switch terminal current for a given amount of bias current. For example, a 55 mA switch would require about 6 mA of bias current, have a conduction impedance of about 2.6 ohms and dissipate about 300 mW of power as current flows between the battery and ground when the switch is on.

A third embodiment of the analog switch cell of the present invention is illustrated in FIG. 206. As seen therein, the switch includes two BJTs Q1 and Q2, the collectors 220 of which are electrically connected to the switch terminals S1 and S2. The emitters 222 of Q1 and Q2 are electrically connected through a resistor 224. The biasing circuits of the transistors Q1 and Q2 include, respectively, current sources I1 and I2 which provide control current to operate the switch, and cross-coupled (emitter-to-base) current limiting circuits comprising diode 226 and resistor 230, and diode 228 and resistor 232, respectively.

With switch terminal S1 more positive than terminal S2, the switch current path at low voltages is from S1 to S2 through resistor 224. As switch voltage increases, diode 226 provides an additional path for switch current from the emitter of transistor Q1 through the resistor 230 to the base of transistor Q2, thereby increasing the bias current to the reverse operating transistor Q2.

The differential biasing of the BJTs Q1 and Q2 permits the BJTs to be high voltage devices not normally acceptable because of the inherent difference in the current gain in the forward and reverse operation of high voltage transistors. Although not required for operation of the switch, symmetrical switch terminal I/V characteristics may be achieved by matching components i.e., the transistors Q1 and Q2, diodes 226 and 228, resistors 230 and 232, and current sources I1 and I2.

Experiments have shown that switch gain is significantly effected by the presence of diodes 226 and 228 and resistors 230 and 232. In the experiments, removal of the diodes and resistors from the circuit of FIG. 206 resulted in a switch gain of 2.

With the switch resistance in the on condition $R_{on}$=250 Ω, with I1=I2=100 μA and with the maximum saturation current Is(max)=400 μA, the gain may be calculated as follows:

$$Gain=Is(max)/(I1+I2)=2 \qquad (1)$$

With the diodes and resistors included as shown in FIG. 206, and with $R_{on}$=1.67 KΩ, with I1=I2=100 μA, with Is(max)=6 mA, with $R_{24}$=1 KΩ, and with $R_{30}$=$R_{32}$=5 KΩ, the switch gain may be calculated as follows:

$$Gain=Is(max)/(I1+I2)=30 \qquad (2)$$

In addition to the high gain that may be achieved by the switch disclosed in FIG. 206, the range of linearity may also be controlled by appropriate selection of resistor values. As may be seen with reference to FIG. 207, the I/V characteristics of the switch nay change significantly at the point A at which the diode 226 conducts. The slope of the I/V curve at low voltages (before the diode 226 conducts) is controlled by the value of resistor 224 while the slope of the I/V curve at high voltages (after the diode 226 conducts) is controlled by the values of resistors 230 and 232, i.e., the higher the resistance, the less slope to the I/V curve.

The adjustability of the slope in the high voltage region of the switch may find utility in various devices. For example, the switch can be used for wave shaping or for gain control.

The resistors 230 and/or 232 may have variable resistances that can be controlled to achieve the desired wave shape or gain. The resistors may also be made to vary automatically, for example in response to changes in the switch current, by the replacement of the resistors with conventional variable impedance devices.

It is to be understood that gangs of transistors in series or in parallel may have utility in a particular application. The paralleling of the bidirectional switches of opposite semiconductivity type may have particular utility in applications where the current source(s) are common to both switches as hereinafter described in greater detail in Section 3. Since the current carrying capacity of such switch is doubled for a particular value of control current, the gain may be doubled and power consumption significantly decreased.

With reference now to FIG. 208, the resistance in the switch in the embodiment of FIG. 206 may be reduced by providing current limiting transistors. Such transistors allow the resistance of the emitter coupling resistor to be reduced so that total switch resistance is decreased.

More specifically, transistors Q3 and Q4 and resistors 252 and 254 provide current limiting. With current flow from S1 to S2, transistor Q3 turns on and diverts some of the current from the source I1 away from the base of transistor Q1 when the voltage drop across resistor 250 exceeds the base-emitter voltage of transistor Q3. The reduction in current applied to transistor Q1 limits the collector current (the switch current) while resistors 252 and 254 add to the switch "on" resistance so that the resistance in resistor 250 may be reduced proportionally.

In some applications, the switch of the present invention may be used in a circuit that is not symmetrical, e.g., where the switch voltage varies from −1 to +10 volts. In this event, an offset can be provided by using different values of resistance in resistors 252, 254, 230 and 232 in the circuit of FIG. 208.

While the switch of the present invention has common emitters so that the switch may be used in high voltage circuits, the switch may find application in circuits where the maximum switch voltage is less than about 10 volts. In this event, a common collector configuration may be used as one skilled in the art will appreciate.

An embodiment of the switch of FIG. 206 that may find application in a high voltage telephone circuit is illustrated in FIG. 209. As may be seen from a comparison of the circuits of FIG. 206 and FIG. 209, current sources I1 and I2 have been replaced with high voltage current sources. Current mirror transistors Q7 and Q8 provide base drive to transistors Q1 and Q2 to turn on the switch. Current mirror transistors Q9 and Q10 remove current equal to that supplied by Q7 and Q8. Therefore, the control current does not give the switch a current offset. The current mirrors are referenced to the high voltage supplies. For a 1:1 current mirror ratio, I1 should have the same value as I2.

The switch of FIG. 209 is turned on and off by turning on and off the current source I1. With source I1 off, source I2 pulls the bases of the transistors Q1 and Q2 to the most negative supply, insuring that both collector-base junctions are reverse biased and absorbing any leakage currents. As the switch gain is about 8 before diode 226 turns on, the current sources I1 and I2 would have to be about 200 μA to allow the switch current to get high enough for diode 226 to turn on. The total current flowing between the high voltage supplies would be about 600 μA and the resultant power dissipation would be 152 mW.

Current limiting may also be provided for the high voltage telephone circuit of FIG. 209 as indicated by the addition of the current limiting transistors Q3 and Q4 illustrated in FIG. 208.

As discussed above, the switch current and switch gain may be increased for low voltage transistors, or high voltage transistors may be used without an offset, by the selective increase in the bias of the reverse operating transistor over the bias of the forward operating transistor.

In addition, the range of linearity may be increased by such dynamic bias adjustment.

Bias current may be dynamically responsive to switch current or switch voltage, and the inequality may be provided in particular applications by limiting the current to the forward operating transistor. In addition, bias current may be unequally supplied from a single current source, unequally supplied from multiple sources, or provided at high switch voltage by the addition of some portion of switch current to the bias circuit.

SECTION 3—INTEGRATED CIRCUIT SWITCH CELLS

In yet another aspect, the present invention relates to analog switches which have particular utility in the subscriber line circuit described in the foregoing Section 1, as well as in other applications where it is desirable to implement the switch in a semiconductor integrated circuit.

Semiconductor integrated circuit switches ("ICs") are well known, as are their advantages. It has been found particularly advantageous to implement certain of the switches of the preceding Section 2, the advantages of which are described above, in an integrated circuit.

Further, the implementation of such switches in a physical structure has resulted in still additional improvements in size, cost and the operating characteristics of the switch as is described in greater detail below.

It is accordingly an object of the present invention to implement an analog bidirectional switch or variable resistor in a semiconductor integrated circuit.

It is another object of the present invention to provide a novel current controlled integrated circuit switch.

Other objects include the provision of novel methods of making integrated circuits, controlling current flow, and of increasing gain and reducing power conduction in switches.

These and many other objects and advantages will be readily apparent to one skilled in the art from the following description of preferred exemplary embodiments.

BRIEF DESCRIPTION OF THE DRAWINGS

Figure 23:
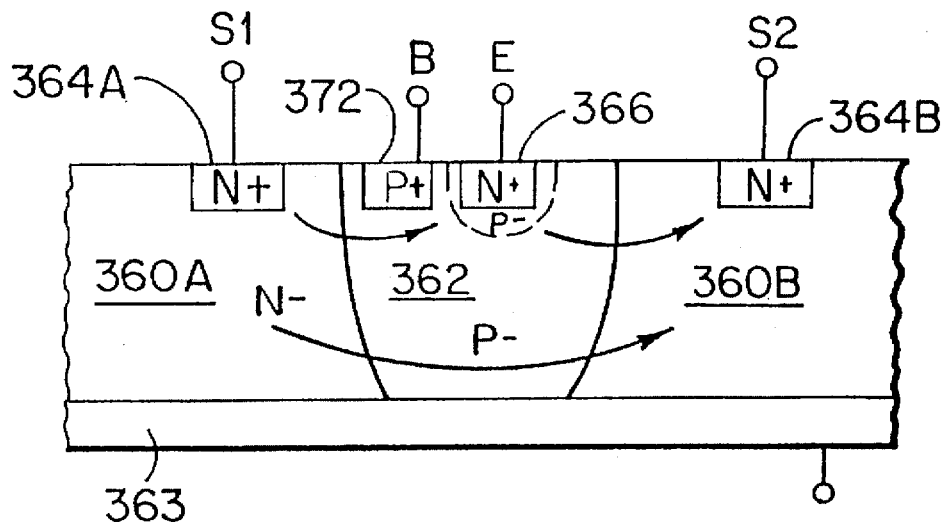

FIG. 23 (hereinafter FIG. 301) is an elevation in partial cross-sectional of a first embodiment of the integrated circuit of the present invention.

Figure 24:
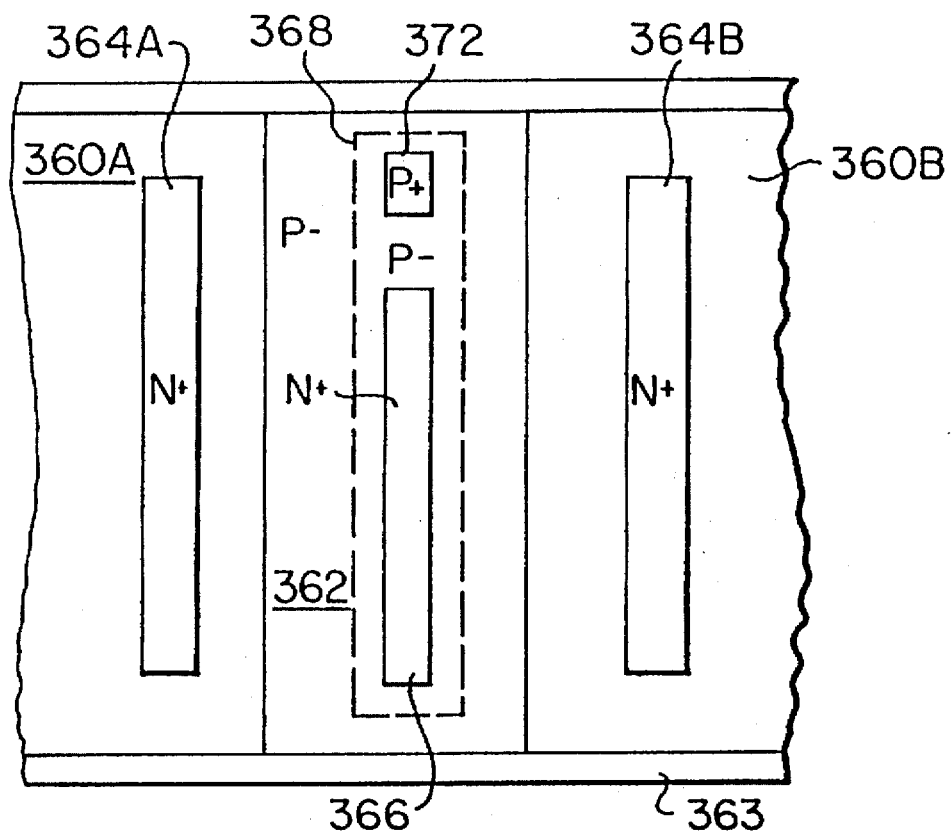

FIG. 24 (hereinafter FIG. 302) is top plan view of the integrated circuit of FIG. 301.

Figure 25:
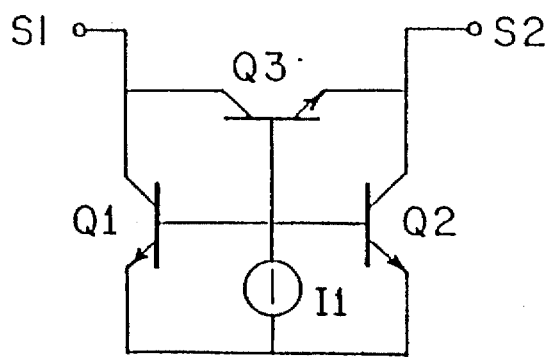

FIG. 25 (hereinafter FIG. 303) is a schematic circuit diagram approximating the circuit of the IC of FIGS. 301 and 302.

Figure 26:
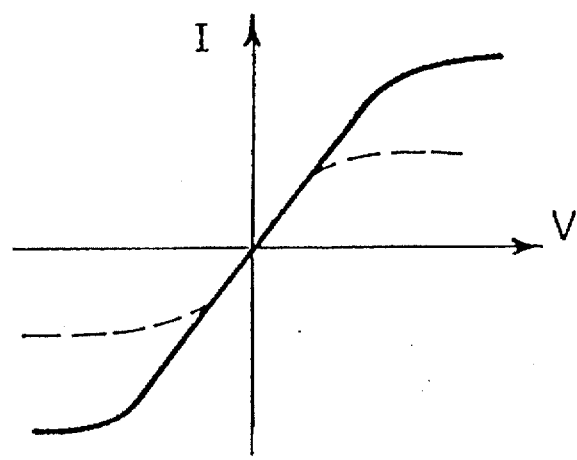

FIG. 26 (hereinafter FIG. 304) is a graph illustrating the extended range of linearity of the circuit of FIGS. 301–303.

Figure 27:
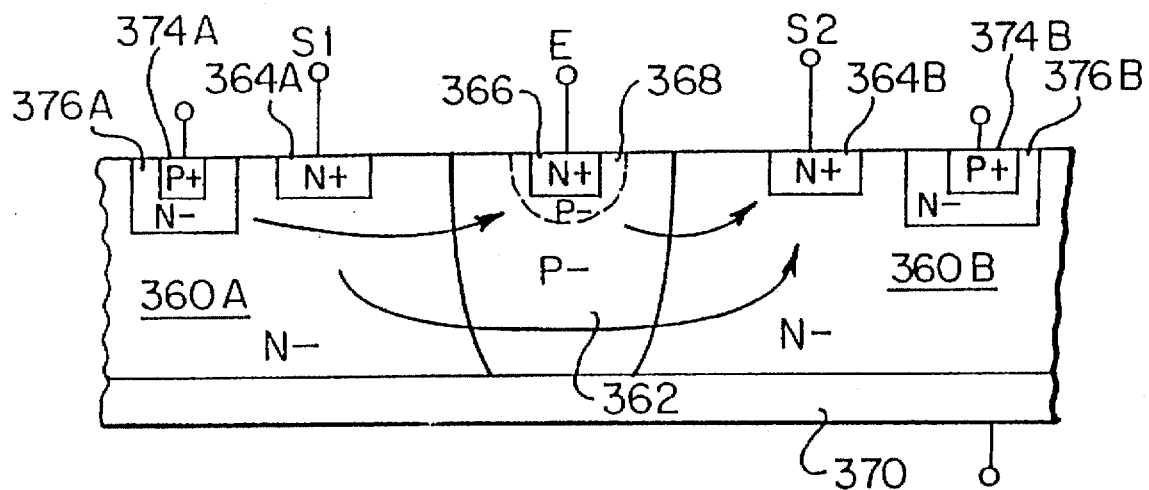

FIG. 27 (hereinafter FIG. 305) is an elevation in partial cross-section of a second embodiment of the integrated circuit of the present invention with significantly reduced resistance as a result of the site of the injection of control current.

Figure 28:
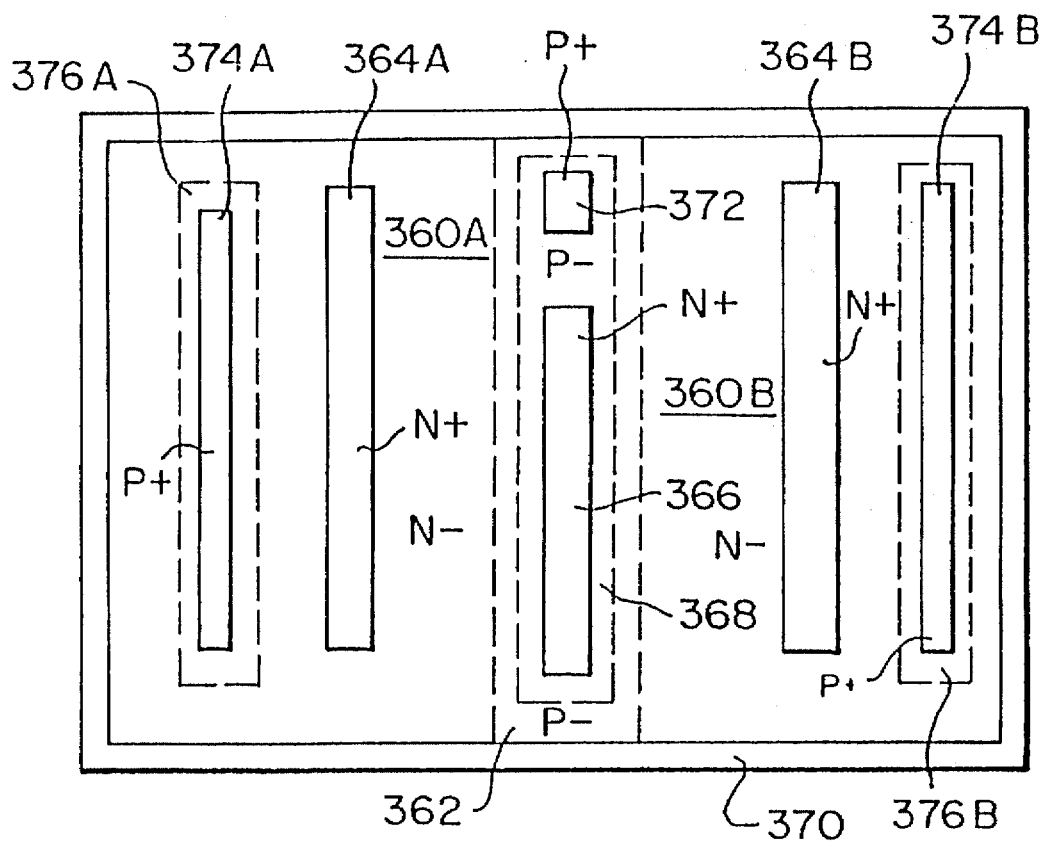

FIG. 28 (hereinafter FIG. 306) is a top plan view of the integrated circuit of FIG. 305.

Figure 29:
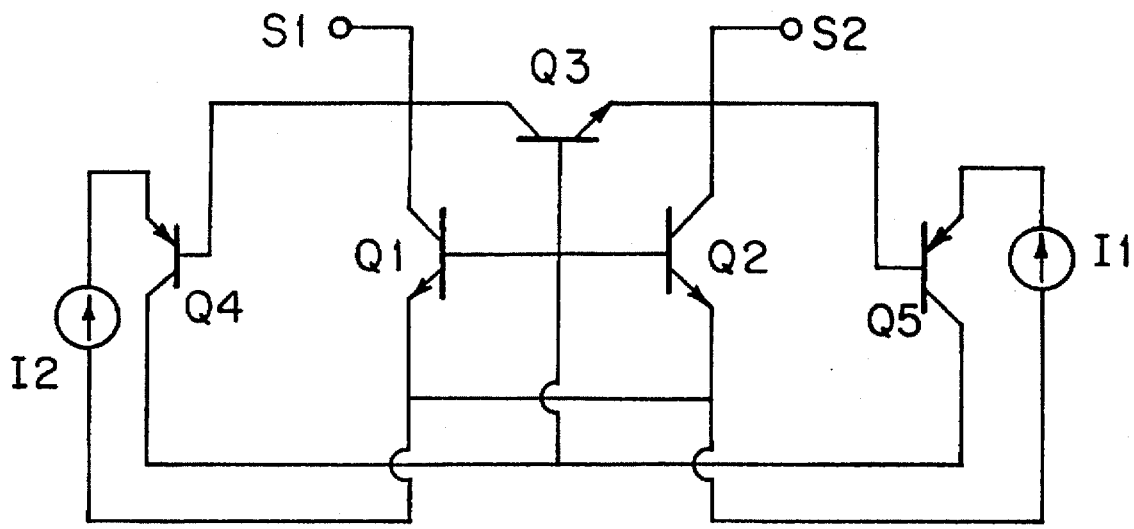

FIG. 29 (hereinafter FIG. 307) is a schematic circuit diagram approximating the circuit of the IC of FIGS. 305 and 306.

Figure 30:
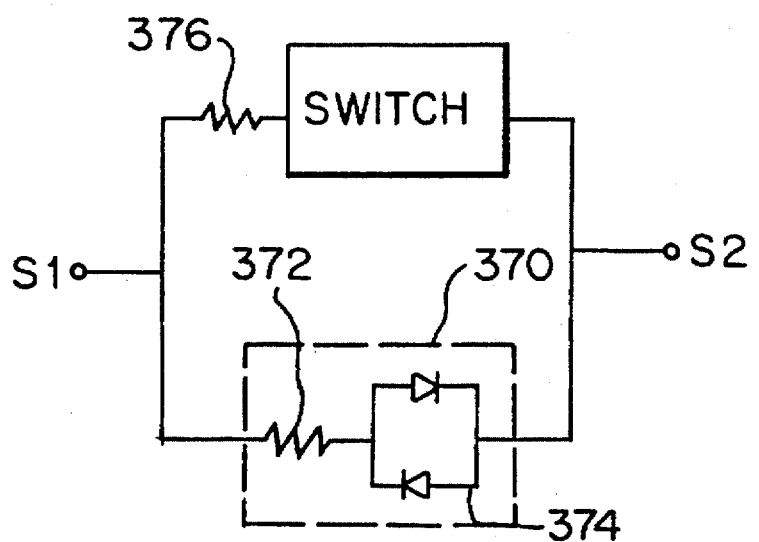

FIG. 30 (hereinafter FIG. 308) is a schematic circuit diagram of a circuit having an increased range of linearity that incorporates the circuit of the present invention in one parallel arm thereof.

FIG. 31 (hereinafter FIG. 309) is a graph illustrating the I/V response of the prior art portion of the circuit of FIG. 308.

FIG. 32 (hereinafter FIG. 310) is a graph illustrating the increased range of linearity in the I/V response of the circuit of FIG. 308.

DESCRIPTION OF PREFERRED EMBODIMENTS

With reference now to FIGS. 301, 302 and 303 where a first embodiment of the novel integrated circuit of the present invention may be seen, the circuit comprises two base and emitter coupled bipolar junction transistors ("BJTs") Q1 and Q2 as the primary control element, and includes a third BJT Q3 which serves as the principal path for the switch current.

The physical structure and circuit of the present invention may be readily understood in the context of a bidirectional switch and for convenience will be described as such. It is to be understood however that the invention is not so limited either in its physical structure or method of operation.

As shown in FIGS. 301 and 302, an integrated circuit switch may include an N− conductivity type island 360 isolated from a substrate and/or other circuit elements by a conventional insulating oxide layer 363. The island 360 may be separated into two electrically isolated regions 360A and 360B by a deep P− conductivity type well 362 that extends into contact with the layer 363 which defines the island 360.

Contacts 364A and 364B of N+ conductivity type, one in each of the isolated regions 360A and 360B, may be connected in a conventional manner to the analog switch terminals S1 and S2 to avoid the creation of rectifying junctions at the point of contact of the metal of the switch lead with the N− semiconductor in regions 360A and 360B. The well 362 isolates the two contacts 364A and 364B to prevent ohmic conduction therebetween.

An N+ conductivity type contact 366 may be diffused into the surface of the well 362 for connection to the common emitter E of BJTs Q1 and Q2 in the circuit. As is well known, a P− conductivity type punch-through shield 368 may be employed to surround the emitter contact 366 inside the well 362 to thereby achieve higher switch voltage blocking capability.

The common base electrode may be formed by connecting a terminal B to a contact 372 of P+ conductivity in the well 362. As with the contacts 364A and 364B, a higher degree of doping avoids the creation of a rectifying junction between the switch lead and the semiconductor.

The switch of FIGS. 301 and 302 may be turned on by applying a positive bias current (with respect to emitter 366) to the base contact B to forward bias the P-N junctions between contacts S1 and S2 to thereby allow ohmic current, that is, electron flow. Removal of the current source between the base B and emitter E contacts removes the forward bias and shuts the switch off without the necessity for any current reversal.

The principal current path of the switch current is from the terminal S1 and switch contact 364A of FIGS. 301 and 302, through the region 360A (the collector of transistor Q3 of FIG. 303) and the P-N junction formed with the region 362 (the base of transistor Q3) and the P-N junction with region 360B (the emitter of transistor Q3) to the switch contact 364B and terminal S2.

There is a secondary current path from the terminal S1 and switch contact 364A of FIGS. 301 and 302, through the region 360A (the collector of transistor Q1 in FIG. 303) through the P-N junction formed with the region 362 (the base common to all transistors) to the region 366 (the emitter common to transistors Q1 and Q2); and thereafter from the emitter region 366 through the P-N junction formed with the region 362 (the base of transistor Q2) and through the region 360B (the collector of transistor Q2) to the contact 364B and switch terminal S2.

The control current consisting of positive holes flows into the base B at contact 372 and out of the emitter contact 366. This injection of holes at the base contact 372 tends to balance the charge of the electrons injected by the contact 364A associated with the switch terminal S1 and thereby contributes to the conductivity modulation of the N− and P− regions. Contact 372 may also be located inside the punch-through shield 368 as illustrated in FIG. 302 to alternatively increase the breakdown voltage for a given spacing or to reduce component spacing for a given breakdown voltage. In addition, the placing of the contact 372 inside the shield reduces to a small extent the electron recombination current to contact 372.

In operation, and with reference to FIG. 303, the control current I1 divides among Q1, Q2 and Q3, with most of the current going to the base of Q3. The return path for the control current is through the emitters of Q1, Q2 and Q3 (the further return path for control current in the emitter of Q3 is through the collector to the emitter of Q2). With the switch current flowing from S1 to S2, the holes of the control current from the base of Q3 recombine at contact 364B with electrons of S2 that have moved from contact 366 (the common emitter of Q1 and Q2) to contact 364B.

Obviously, there are fewer P-N junctions and hence less resistance in the first path described above, i.e., through the transistor Q3 of FIG. 303. The novel construction of the integrated circuit containing the transistors allows a substantial reduction in the size of the circuit, primarily as a result of the sharing of BJT elements; for example, the sharing of base regions by all three transistors, the sharing of emitter regions by transistors Q1 and Q2, and the sharing of collector regions by transistors Q1 and Q3.

The space savings of the structure of the present invention may be used to reduce circuit size for a given voltage or to increase the voltage for a circuit of a given size. For example, an IC switch used in existing telephone circuits may have a substantially higher voltage capability than was heretofore available.

Further, the structure of the present invention provides higher switch gain than existing circuits for comparable voltages. To reduce control current for a given switch current, and thereby increase switch gain, the hole recombination current must be reduced. Hole recombination current reduction is achieved in the present invention by taking advantage of the space savings in the above-described structure by i.e., (a) reducing the distance between S1 and S2 and (b) increasing the cross-sectional area of the semiconductor between S1 and S2. Hole recombination current reduction is also achieved by reducing recombination losses at emitter contact 366 i.e., by reducing electron current flowing through the emitter contact since most switch current flows through region 362 rather than through emitter contact 366.

The control current into the switch must equal the control current removed for the switch to have a zero offset. The structure of the present invention provides an added benefit in that the offset of the switch is approximately zero as may be seen by reference to FIG. 304. Moreover, as may be seen in FIG. 302, the switch is also physically symmetrical to facilitate the zero offset.

For a given circuit size, the switch of FIGS. 301–303 provides a highly advantageous increase in the range of linearity of switch current to switch voltage without offset because the breakdown voltage nay be higher than previously known due to the increased spacing available. That is, increased linearity is achieved by increasing the control current.

An alternative to the switch configuration illustrated in FIGS. 301–303 is illustrated in FIGS. 305–307 where the control current may be injected through the P+ contacts 374A and 374B positioned near the switch contacts 364A and 364B. Contacts 374A and 374B may be located inside N– type punch through shields 376A and 376B, depending upon breakdown requirements.

The advantage of placing the P+ control current contacts near the switch contact 364A and 364B is that any hole current, due to recombination, lowers resistance by reducing the potential drop in the N– region that has the more positive potential. In other words, the hole control current for the switch and the switch terminal current move in the same direction. As a result, the embodiment of FIGS. 305–307 is able to provide better current gain at high current densities than the embodiment of FIGS. 301–303. The disadvantage is that the circuit supplying the bias current must withstand the maximum switch "off" voltage.

With continued reference to FIGS. 305 and 306, the principal current path of the switch current is from the terminal S1 and switch contacts 364A,. through the region 360A (the collector of Q3 in FIG. 307) and the P-N junction formed with the region 362 (the base of Q3) and the P-N junction with region 360B (the emitter of Q3) to the switch contact 364B and terminal S2.

At least half of the control current is injected at contact 374A. Thereafter, most of the control current proceeds from contact 374A (the emitter of Q4), through region 360A (the base of Q4) to region 362 (the collector of Q4 and the base of Q3). The movement of the control current (holes) from left to right in FIG. 305 enhances switch current (electron) flow from contact 364A to contact 364B.

The operation of the integrated circuit of FIGS. 301–303 and 305–307 may be further improved by using polysilicon material (silicon that is deposited in a random structure rather than grown in a single crystalline structure) in the contacts 364A and B, 366, 372 and 374A and B. As is known, the use of polysilicon material increases the gain of the switch by further decreasing hole recombination currents at the contacts.

While the operation of the circuit of FIGS. 301–303 and 305–307 have been described in only one direction, i.e., from switch contact S1 to switch contact 52, the circuits are bidirectional and operate with current flow in both directions. For this reason they are particularly well adapted for the a.c. "ring" and audio signal found in telephone circuits.

Additional size and cost savings may be realized by incorporating the well depth reduction techniques taught by James D. Beasom in the U.S. Pat. No. 5,270,569, titled "Method and Device in which Bottoming of a Well in a Dielectrically Isolated Island is Assured" filed concurrently herewith and assigned to the assignee of the present invention, the disclosure of which is hereby incorporated herein by reference.

The circuits described in FIGS. 303 and 307 may be implemented with discrete circuit components. However, as indicated above, the integrated circuit of the present invention is more efficient than an embodiment implemented with discrete circuit components. For example, because it includes only two P-N junction crossings (the interface of region 360A with region 362, and the interface of region 362 with region 360B) as contrasted with the four P-N junction crossings necessitated by the use of two discrete transistors, each having an emitter-to-base and base-to-collector junction. The efficiency or gain of the integrated circuit of the present invention may be about twice that of a discrete component circuit at high current densities of about 100 amps/cm$^2$ and up to 100 times that of a discrete component circuit at low current densities. The increase in efficiency is related to the lower hole recombination current at the single common emitter terminal 366 found in the structure of the present invention, as contrasted with the higher hole recombination currents found at the multiple emitter terminals associated with multiple discrete components.

While the increase in the range of linearity afforded by the above-described embodiments may be sufficient for many applications, a further increase in the range of linearity may be desired. With reference now to FIG. 308, the above-described switch circuits may be used in parallel with a known resistance device 370. Such a device may include a resistor 372 in series with oppositely-directed, parallel silicon controlled rectifiers ("SCRs") 374. As is known, the device 370 does not conduct at low voltage levels and has the I/V curve response illustrated in FIG. 309. The switch circuits of the present invention conduct linearly at low voltage levels and have I/V curves such as shown in FIG. 304 that may flatten at about a milliamp. When the device 370 is arrayed in parallel with the switch of FIGS. 301–307, the resulting switch has an increased range of linearity as illustrated in FIG. 310, i.e., the switch of FIGS. 301–307 is effective for the first milliamp and the device 370 (nonconducting when the other path is effective) thereafter becomes effective. A resistor 376 may be placed in series with the switch of the present invention to remove discontinuities from the resulting I/V curves. The resistors 372 and 376 may be fixed, or made variable if the circuit is intended to selectively provide predetermined I/V responses.

With reference now to FIGS. 311 and 312, a further embodiment of the present invention may include a switch cell 390 having switches A and B arranged in parallel as illustrated in FIG. 311.

As illustrated in FIG. 312, each of the switches A and B may include the switch embodiment of FIG. 303, with one of the switches having NPN transistors Q1, Q2 and Q3, and the other switch having PNP transistors Q4, Q5 and Q6. Each of the switches may have its own current source (not shown), or preferably have a common current source I1 to effectively double the gain of the switch cell 390. The common emitters of Q1 and Q2 may be connected to the common emitters of Q4 and Q5 or may be independent thereof.

Current source I1 may be used to operate both switches A and B with the same current that would normally operate a single one of the switches (i.e., the current is directed to the P-type bases of transistors Q1, Q2 and Q3 as well as from the N-type bases of transistors Q4, Q5 and Q6). As is well known, the current carrying capacity of the parallel circuit is twice that of either switch alone. As is apparent from an analysis of the circuit in FIGS. 311 and 312, the use of a single current source I1 to operate both switches A and B doubles the amount of current that can flow from S1 to S2 through switch cell 390 for any given voltage capability of switches A and B. Since this is achieved without any increase in the control current, the gain of the switch cell 390 is doubled and the power dissipated is halved.

While the exemplary switch embodiments have been described in the foregoing with particular types of semiconductor material, it is to be understood that the types of semiconductor material may be changed in further embodiments.

SECTION 4-HIGH VOLTAGE CURRENT SOURCE

In still another aspect, the present invention is directed to a novel current source for the current controlled switch of the preceding Sections 2 and 3.

Current sources are well known and have long been used in controlling the operation of switches. However, with certain high voltage switches as described above, it is necessary to protect the current source from the excessive voltage transients to which the switch may be subjected. This protection is provided in one embodiment by the use of high voltage blocking switches on both sides of the current source, i.e., the current source and the current sink. In another embodiment, one of the high voltage blocking switches may be omitted by the use of a second current sink as hereinafter described.

As earlier described, various embodiments of the switch of the present invention are current controlled and may find application in high voltage environments, such as telephone circuits. In contrast to the electromechanical switches of the prior art in which the control current (relay activation current) and switch current are isolated from each other, the current source for the analog switch of the present invention must be able to withstand the maximum voltage of the switch where the switch current and switch control current pass through the same circuit. To be able to hold the switch in the "off" condition in the presence of transients on the switch terminals, and to be capable of operation without contributing to the switch current to produce an offset in the voltage/current response of the switch, the current sources and sink must be protected by a current blocking switch capable of withstanding a voltage range $\pm V_{EE}$ or about 300 volts when the switch is in the "off" position. When the switch is in the "on" position, the voltage across the switch terminals is limited to ground and $V_{BAT}$, i.e., the voltage appearing on the telephone line pair used to power the individual telephone, and thus to about 50 volts, so that this protection is not required.

It is accordingly an object of the present invention to provide a novel high voltage current source and a novel method by which a current source may be protected.

These and many other objects and advantages will be apparent from the following description of exemplary embodiments.

BRIEF DESCRIPTION OF THE DRAWINGS

Figure 33:
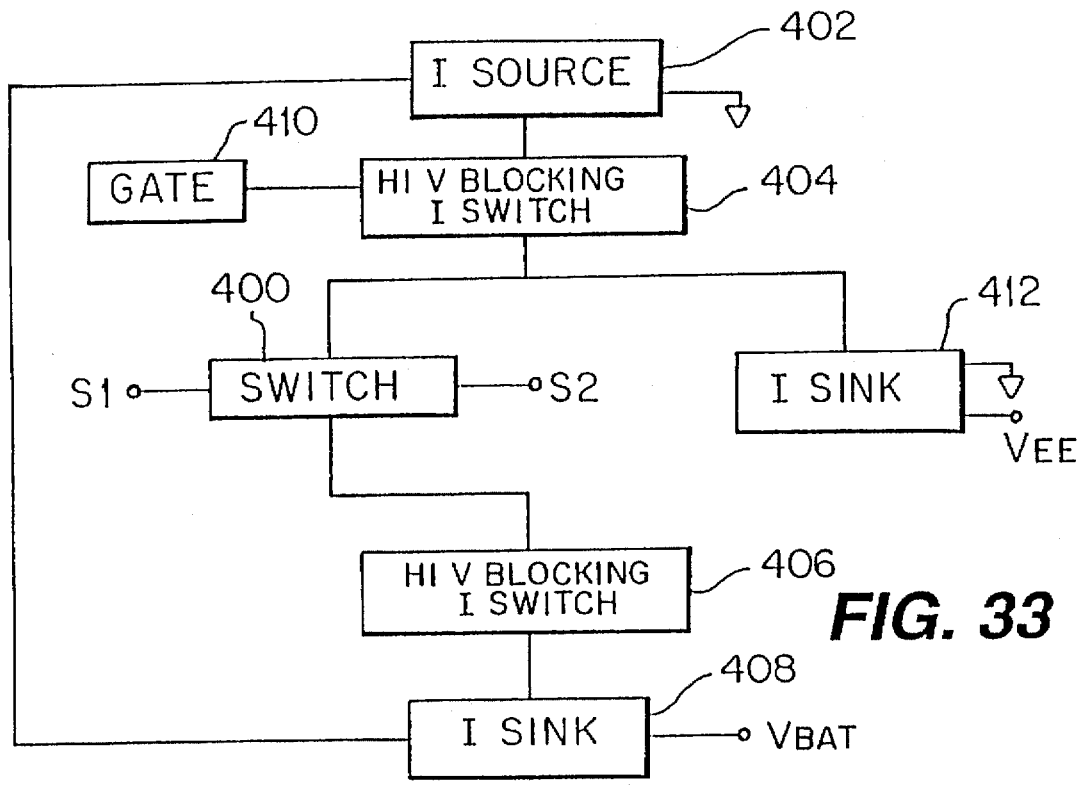

FIG. 33 (hereinafter FIG. 401) is a functional block diagram illustrating the operation of the current source of the present invention.

Figure 34:
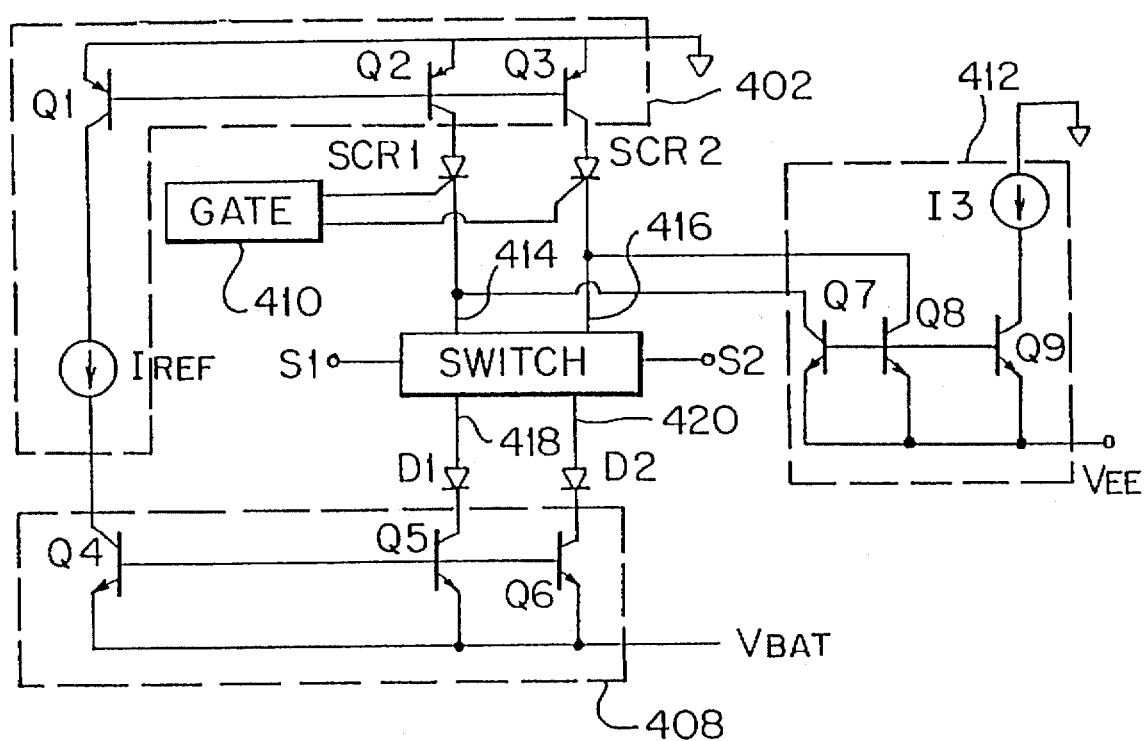

FIG. 34 (hereinafter FIG. 402) is a schematic circuit diagram illustrating one embodiment of the circuit of FIG. 401.

Figure 35:
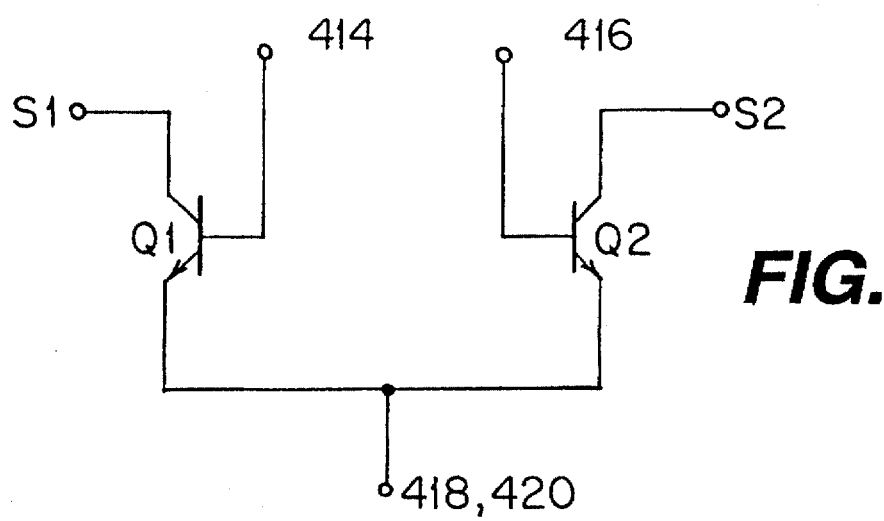

FIG. 35 (hereinafter FIG. 403) is a schematic circuit diagram illustrating one embodiment of the switch which may be used in the circuit of FIGS. 401 and 402.

Figure 36:
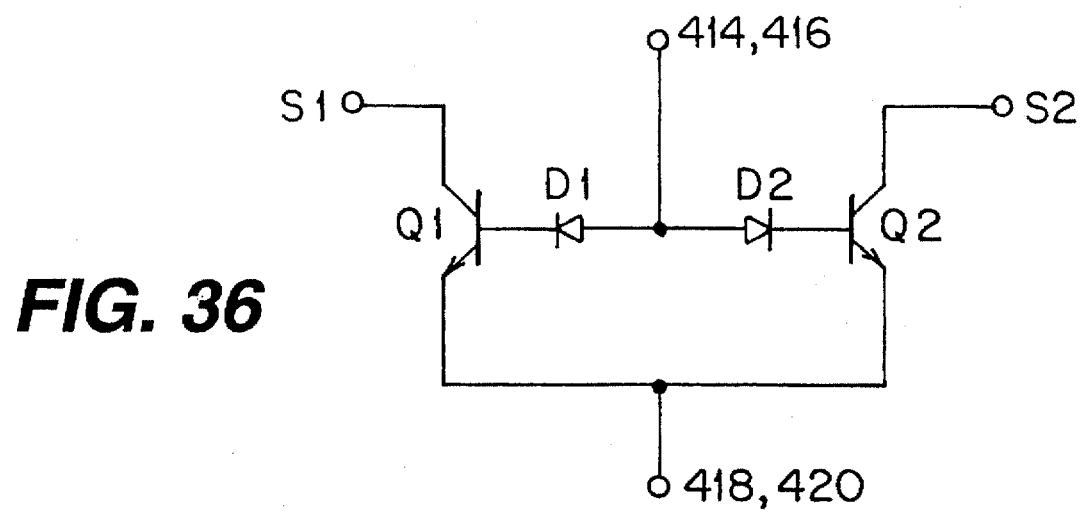

FIG. 36 (hereinafter FIG. 404) is a schematic circuit diagram of a second embodiment of the switch of FIGS. 401 and 402.

Figure 37:
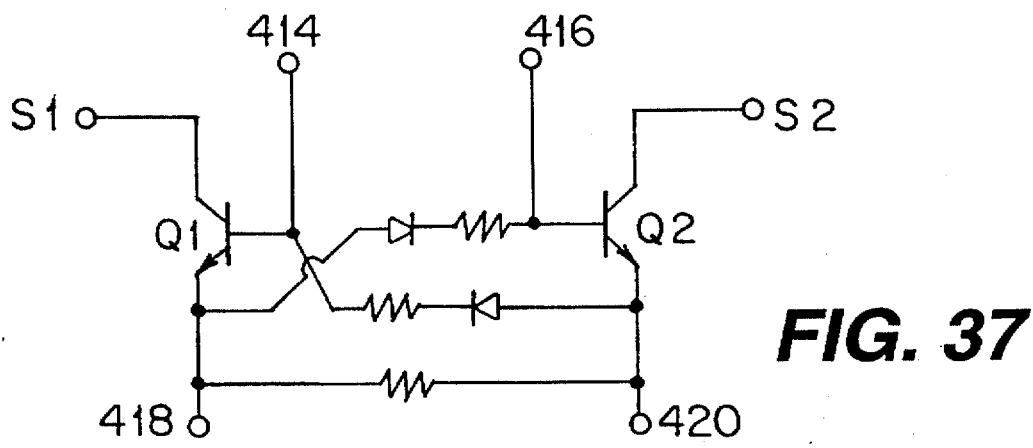

FIG. 37 (hereinafter FIG. 405) is a schematic circuit diagram of a third embodiment of the switch of FIGS. 401 and 402.

Figure 38:
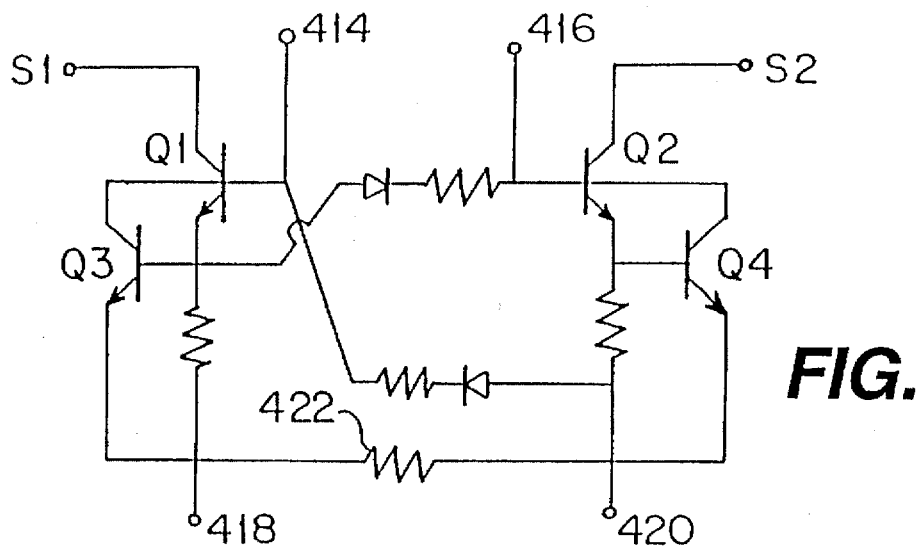

FIG. 38 (hereinafter FIG. 406) is a schematic circuit diagram of a forth embodiment of the switch of FIGS. 401 and 402.

Figure 39:
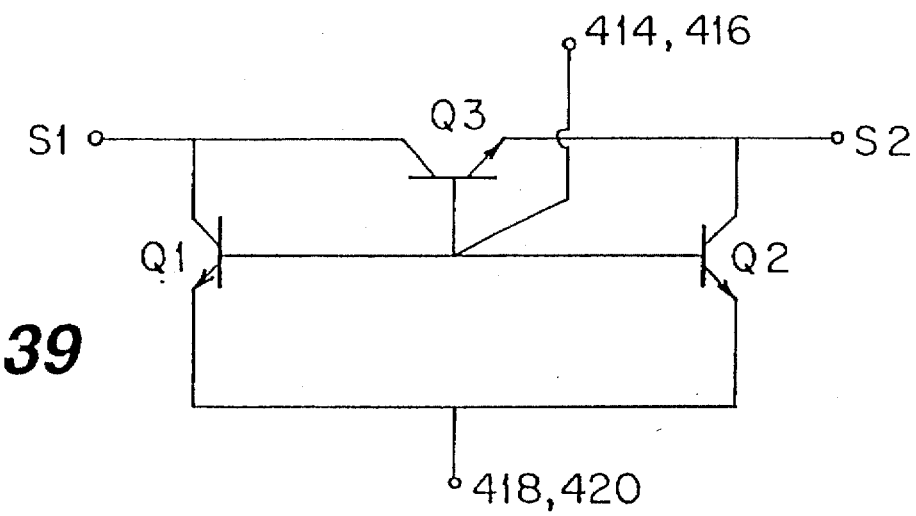

FIG. 39 (hereinafter FIG. 407) is a schematic circuit diagram of a fifth embodiment of the switch of FIGS. 401 and 402.

Figure 40:
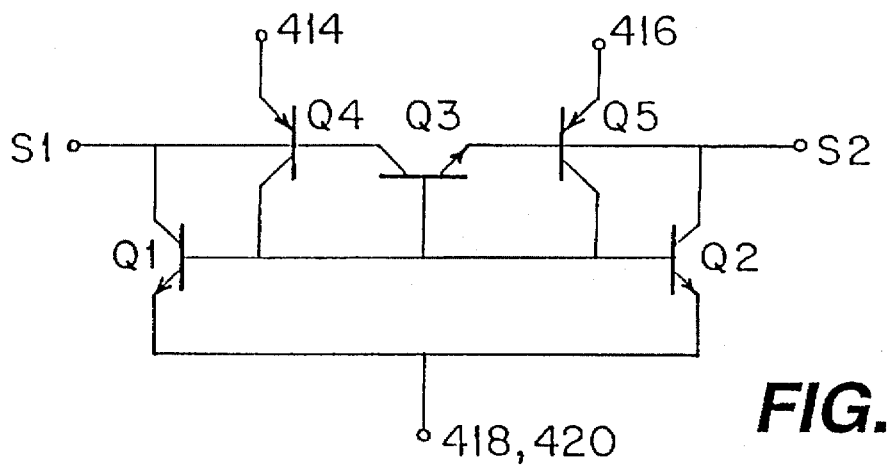

FIG. 40 (hereinafter FIG. 408) is a schematic circuit diagram of a sixth embodiment of the switch of FIGS. 401 and 402.

Figure 41:
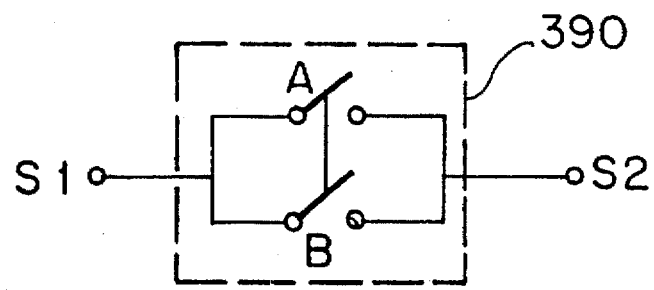

FIG. 41 (hereinafter FIG. 311) is a schematic circuit diagram of a circuit showing switch cell 390 having switches A and B in parallel.

Figure 42:
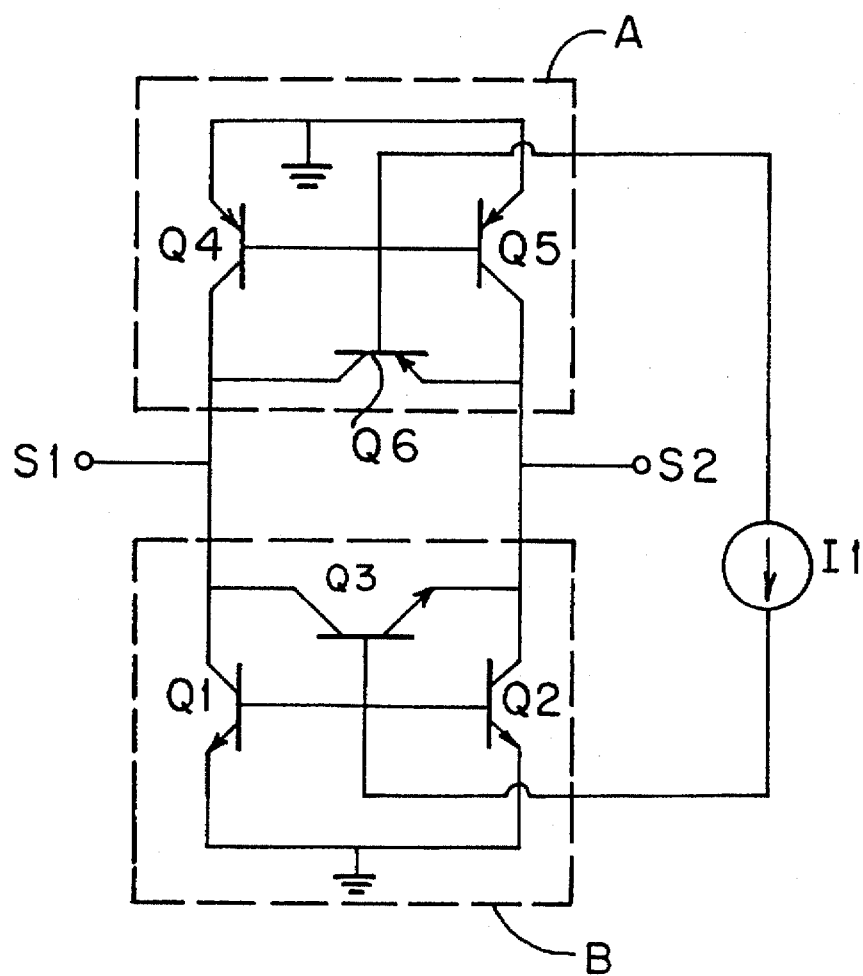

FIG. 42 (hereinafter FIG. 312) is a schematic circuit diagram of one embodiment of switches A and B.

DESCRIPTION OF EXEMPLARY EMBODIMENTS

With reference to FIG. 401, a switch 400 is illustrated as having terminals S1 and S2 to which bidirectional signals may be applied. Such bidirectional signals may include the audio frequency voice communication signals. The switch 400 is in the "on" condition only when the control current is positive.

The current for operating the switch 400 may be supplied by a current source 402 through a high voltage blocking current switch 404 with a return path provided through a high voltage blocking current switch 406 and a current sink 408. The operation of the high voltage blocking current switch 404 may be controlled by a suitable conventional gate circuit 410 that operates in response to an appropriate low voltage logic signal.

A current sink 412 is provided to insure that the switch cell 400 remains turned off in the presence of transients or noise on the terminals S1 and S2 and thermally generated leakage currents. The current sink 412 pulls the control terminals of the switch 400 to the most negative potential $V_{EE}$ expected to be encountered in the circuit when the switch 400 is in the "off" condition, $V_{EE}$ being more negative than $V_{BAT}$. By so doing, a transient that is more negative than $V_{BAT}$ (which cannot by definition be more negative than $V_{EE}$) will not create a positive potential in the control circuit that may inadvertently place the switch in the "on" condition.

The protection afforded by blocking switches 404 and 406 is not needed when the switch 400 is in its "on" condition. With the switch 400 "on", the switch terminals S1 and S2 are clamped somewhere between ground potential and the negative potential of the battery $V_{BAT}$ by the normal operation of the telephone circuit. However, when the switch 400 is in its "off" condition, it is possible for a signal to appear on the terminals S1 and S2 of the switch 400 which is outside of the acceptable range, i.e., a signal greater than ground or more negative than $V_{BAT}$. As discussed above, the voltage $V_{EE}$ is determined to be equal to the greatest negative signal expected in the circuit and is more negative than $V_{BAT}$. Accordingly, under these conditions, the switch is turned off and the current source 402 and current sink 408 are protected from a high voltage on the terminals S1 and S2.

FIG. 402 illustrates one embodiment of the circuit of FIG. 401. With continued reference to FIG. 401, and with reference to FIG. 402, the current source 402 includes transistors Q1, Q2 and Q3, a current source $I_{REF}$, and current sink 408 includes transistors Q4, Q5 and Q6. In this embodiment, the current source 402 and current sink 408 include "mirror" circuits that are well known in the art i.e., circuits that reverse the polarity of the control signal and may serve to effect a signal level change.

Isolation of the current source 402 from the switch 400 is accomplished by high voltage silicon controlled rectifiers SCR1 and SCR2 forming the blocking switch 404 that is controlled by the gate circuit 410. Isolation of the switch 400 from the current sink 408 is accomplished by means of the high voltage diodes D1 and D2 forming the blocking switches 406.

In an appropriate circuit, the high voltage silicon controlled rectifiers SCR1 and SCR2 may be replaced by high voltage transistors.

With continued reference to FIGS. 401 and 402, the current sink 412 may also include a current mirror comprising transistors Q7, Q8 and Q9 operable with a suitable conventional current source 13 between ground and $V_{EE}$. The current sink 412 is connected to the cathodes of SCR1 and SCR2 to insure that there is no inadvertent partial turn on of the switch 400. With the current sink 412 "on", the control terminals of the switch 400 have the same potential as $V_{EE}$, the most negative potential in the circuit, to insure the switch 400 remains in the "off" condition.

As is apparent, the gate circuit 410 operates to cause the current switch 404 to conduct during the time that the current source $I_{REF}$ is "on". During this period, the current source I3 is "off" so that switch 400 is operated under control of the current $I_{REF}$. With the current source $I_{REF}$ in the "off" condition, current source I3 is in the "on" condition to insure that the switch 400 remains in the "off" condition with no signal passing in either direction between the terminals S1 and S2.

As apparent from FIG. 401, high voltage blocking current switches may be used to protect both the current source 402 and the current sink, 408. However, the presence of the current sink 412 eliminates the need for the blocking current switch 404 and the associated gate 410 because it provides a sink for excessive current from the switch 400.

With reference now to FIG. 403 where a first embodiment of the switch 400 of FIGS. 401 and 402 is illustrated, the switch may comprise transistors Q1 and Q2 having common emitters and with the control terminals 414 and 416 connected respectively to SCR1 and SCR2 and with the control terminals 418, 420 connected respectively to the diodes D1 and D2. As shown in FIG. 403, the control terminals 418 and 420 may be common and one of the two parallel combinations of diode D1 and transistor Q5 and diode D2 and transistor Q6 of FIG. 402 may be eliminated. One of the parallel paths in the current mirror circuit of current sink 408 may also be eliminated.

A second embodiment of the switch 400 of FIGS. 401 and 402 is illustrated in FIG. 404 in which the bases of the transistors Q1 and Q2 are connected through diodes D1 and D2 to the common control terminal 414, 416.

The operation of the switches of FIGS. 403 and 404 are described in detail in connection with Section 2 above.

Other embodiments of the switches 400 of FIGS. 401 and 402 are illustrated in FIGS. 405–408. With reference to FIG. 405, the bases of the transistors Q1 and Q2 are connected to the control terminal 414 and 416, respectively, and the emitters of the transistors Q1 and Q2 are connected to the control terminals 418 and 420, respectively. These connections may also be found in the switch of FIG. 406. The parallel circuits illustrated in FIG. 402 are necessary with the switches of FIGS. 405 and 406 because of the cross coupling of the bases and emitters of the transistors Q1 and Q2, and because of the connection of the emitters of the transistors Q1 and Q2 through a resistor 422. The operation of the switches of FIGS. 405 and 406 is described in more detail in connection with Section 2 above.

Further embodiments of the switches 400 of FIGS. 401 and 402 are illustrated in FIGS. 407 and 408. The switches illustrated therein differ from the switch illustrated in FIGS. 403–406 by the addition of a third transistor Q3 directly between the terminals S1 and S2 of the switch. Transistor Q3 provides the principal signal path between the terminals S1 and S2 as discussed above in Section 3.

As shown in FIG. 407, the bases of transistors Q1, Q2 and Q3 are common and may be connected to the control terminal 414, 416. Alternatively, as shown in FIG. 408, the control terminals 414 and 416 may be connected to the common bases of the transistors Q1, Q2 and Q3 through the emitter-collector path of additional transistors Q4 and Q5. In the circuits illustrated in FIG. 407 and FIG. 408, the common emitters of the transistors Q1 and Q2 are connected to the control terminals 418, 420. The operation of the circuits of FIG. 407 and FIG. 408 is described in more detail above in Section 3.

SECTION 5–ADVANTAGES AND SCOPE OF INVENTION

As discussed above, the present invention relates to telephone networks and more particularly to a subscriber line circuit or card by which the central office or private branch exchange interfaces with the pair of telephone lines leading to the individual subscriber. Many aspects of the circuit are novel, including without limitation several embodiments of discrete and integrated circuit components and the methods by which they are manufactured, integrated with other components and operated.

Among the significant aspects of the present invention are the various embodiments of the switches used at diverse places in the telephone circuits. Because telephone circuits conduct both high voltage "ring" signals and wide bandwidth voice signals, the switches of the present invention are capable of withstanding high voltage without distortion of wide bandwidth signals. Further, many use common elements, and may be identical, so that increased integration of the subscriber line card may be achieved with resulting space, maintenance and manufacturing cost savings. In addition, the switches of the present invention may be ganged together in series or in parallel.

The switch current capacity and switch gain may be increased for low voltage transistors, or high voltage transistors may be used without an offset, by the selective increase in the bias of the reverse operating transistor over the bias of the forward operating transistor without regard to the direction of current flow.

In addition, the range of linearity may be increased by dynamic bias adjustment responsively to switch current or switch voltage, with the inequality provided either by limiting the bias or control current to the forward operating transistor, by unequal supply from a single current source, unequal supply from multiple sources, or at high switch voltages by the addition of some portion of switch current to the bias circuit.

While the switches of the present invention may be implemented with discrete circuit components, the efficiency or gain of the integrated circuit of the present switch of the invention may be about twice that of a discrete component circuit at high current densities and up to 100 times that of a discrete component circuit at low current densities because of the reduced number of junctions.

In the IC implementation of the switches of the present invention, the principal current path of the switch current may be through fewer P-N junctions primarily as a result of the sharing of BJT elements, and therefor offer less resistance. This novel construction allows a substantial reduction in the size of the circuit for a given voltage or an increase in the voltage capability for a circuit of a given size.

Further, the physical structure of the present invention provides higher switch gain than existing circuits for comparable voltages by reducing the distance and increasing the cross-sectional area between switch terminals. The structure of the present invention provides an added benefit in that the offset of the switch is approximately zero and, for a given circuit size, there is a highly advantageous increase in the range of linearity by increasing the control current without fear of breakdown due to the increased spacing available.

Still additional size and cost savings may be realized by incorporating the well depth reduction techniques taught by James D. Beasom in the U.S. Pat. No. 5,270,569, titled "Method and Device in which Bottoming of a Well in a Dielectrically Isolated Island is Assured" filed concurrently herewith and assigned to the assignee of the present invention.

A further increase in the range of linearity may be achieved if the switches of the present invention are used in parallel with a known resistance device such as a resistor in series with oppositely-directed, parallel SCRs, because the switches of the present invention conduct linearly at low voltage levels and the parallel device conducts linearly at high voltages.

The use of the same current source to operate parallel switches (i.e., the current is directed to the P-type bases of transistors in one switch as well as from the N-type bases of transistors in a second switch) doubles the amount of switch current for any given voltage capability of the paralleled switches, and thus doubles the gain of the switch.

The analog switch of the present invention is current controlled and particularly adapted for use in telephone circuits where the switch current and switch control current pass through the same circuit. Because the switch and control current are not isolated, the current source for the analog switch of the present invention must be able to withstand the maximum voltage of the switch, be able to hold the switch in the off condition in the presence of transients in the switch, and be capable of operation without contributing to the switch current to produce an offset in the voltage/current response of the switch.

Isolation of the current source and sink from the switch when non-conducting may be accomplished by high voltage blocking switches, or the use of a second current sink in lieu of the blocking current switch for the current source.

Significant manufacturing and operating advantages are achieved because the components do not have to be closely matched to each other, or to any predetermined value. Linearity may be controlled by appropriate selection of component values to control the I/V characteristics of the switch by adjustment of the point at which certain components conduct, the adjustability of the slope in the high voltage region of the switch. This adjustability may find utility in devices other than telephone circuits, e.g., wave shaping or for gain control, and may be made to vary automatically in response to changes in the switch current by the use of conventional variable impedance devices.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What I claim is:

1. In a telephone subscriber line circuit for relaying audio signals from a digital switch matrix and ring signals to a subscriber wire pair, and having plural relays for plural functions, the improvement wherein at least one of said plural relays comprises a plurality of analog, zero offset, bidirectional, semiconductor integrated circuit switches that have substantially identical operating characteristics.

2. The circuit of claim 1 wherein said plural relays comprise ring, test access and reversal relays and said circuit having no more than sixteen of said switches.

3. The circuit of claim 1 wherein said plural relays comprise ring, test access and reversal relays and said circuit having no more than twelve of said switches.

4. The circuit of claim 1 wherein said circuit comprises ring, test access and reversal relays and has no more than ten said switches.

5. The circuit of claim 1 wherein said functions include ringing, test access and reversal.

6. The circuit of claim 1 wherein all of said switches are part of the same integrated circuit.

7. The circuit of claim 5 wherein the switches of each of said ring, test access and reversal relays are part of the same integrated circuit.

8. The telephone subscriber line circuit of claim 1 wherein each of said switches comprises:
   two bipolar junction transistors; and
   a biasing circuit, said biasing circuit including a single source of current and current limiting means for differentially controlling the conduction of said two transistors.

9. The telephone subscriber line circuit of claim 8 wherein said biasing circuit comprises:
   a first control current source;
   a first high voltage blocking switch means interposed between said first current source and an input control terminal of the switch to be controlled;
   a first control current sink; and
   a second high voltage blocking switch means interposed between said first current sink and an output control terminal of the switch to be controlled.

10. The telephone subscriber line circuit of claim 8 wherein said biasing circuit comprises:
   a first control current source;
   a first control current sink;
   a second control current sink operatively connected to an input control terminal of the switch to be controlled and having a potential that is outside the limits of potential between said first current source and said first current sink; and
   a high voltage blocking switch means interposed between said first current sink and an output control terminal of the switch to be controlled.

11. The telephone subscriber line circuit of claim 1 wherein each of said switches comprises:
   two bipolar transistors each having a first electrode connected to a switch terminal and resistively coupled second electrodes; and a biasing circuit including a current source for each of said transistors and unidirectional means between the second electrode of each of said transistors and the base of the other of said transistors.

12. The telephone subscriber line circuit of claim 11 wherein said biasing circuit comprises:
   a first control current source;
   a first high voltage blocking switch means interposed between said first current source and an input control terminal of the switch to be controlled;
   a first control current sink; and
   a second high voltage blocking switch means interposed between said first current sink and an output control terminal of the switch to be controlled.

13. The telephone subscriber line circuit of claim 11 wherein said biasing circuit comprises:
   a first control current source;
   a first control current sink;
   a second control current sink operatively connected to an input control terminal of the switch to be controlled and having a potential that is outside the limits of potential between said first current source and said first current sink; and
   a high voltage blocking switch means interposed between said first current sink and an output control terminal of the switch to be controlled.

14. The telephone subscriber line circuit of claim 1 wherein each of said integrated circuit switches comprises:
   a dielectrically isolated island having first and second regions of a first conductivity type semiconductor electrically isolated from each other by a third region of the other conductivity type semiconductor;
   means operatively attached to said first and second regions as terminals of the circuit; and,
   means operatively attached to said third region having first and second opposite semiconductor type contacts as the control terminals of the circuit.

15. The telephone subscriber line circuit of claim 14 further comprising a control circuit comprising:
   a first control current source;
   a first high voltage blocking switch means interposed between said first current source and an input control terminal of the switch to be controlled;
   a first control current sink; and
   a second high voltage blocking switch means interposed between said first current sink and an output control terminal of the switch to be controlled.

16. The telephone subscriber line circuit of claim 14 further comprising a control circuit comprising:
   a first control current source;
   a first control current sink;
   a second control current sink operatively connected to an input control terminal of the switch to be controlled and having a potential that is outside the limits of potential between said first current source and said first current sink; and
   a high voltage blocking switch means interposed between said first current sink and an output control terminal of the switch to be controlled.

17. The telephone subscriber line circuit of claim 1 wherein each of said integrated circuit switches comprises:
   first, second and third transistors;
   the bases of all three of said transistors being common; and
   the emitters of said first and second transistors being common.

18. The telephone subscriber line circuit of claim 17 further comprising a control circuit comprising:
   a first control current source;
   a first high voltage blocking switch means interposed between said first current source and an input control terminal of the switch to be controlled;
   a first control current sink; and
   a second high voltage blocking switch means interposed between said first current sink and an output control terminal of the switch to be controlled.

19. The telephone subscriber line circuit of claim 17 further comprising a control circuit comprising:
   a first control current source;
   a first control current sink;
   a second control current sink operatively connected to an input control terminal of the switch to be controlled and having a potential that is outside the limits of potential between said first current source and said first current sink; and
   a high voltage blocking switch means interposed between said first current sink and an output control terminal of the switch to be controlled.

20. The telephone subscriber line circuit of claim 1 wherein each of said integrated circuit switches comprises:
   a semiconductor having five transistors therein,
   the bases of three of said transistors being common with the collectors of the remaining two of said transistors,
   the emitters of two of said transistors being common,
   the collectors of two of said transistors being common with the base of another transistor, and
   the emitter of one transistor, the collector of a second transistor and the base of a third transistor being common.

21. The telephone subscriber line circuit of claim 20 further comprising a control circuit comprising:
   a first control current source;
   a first high voltage blocking switch means interposed between said first current source and an input control terminal of the switch to be controlled;
   a first control current sink; and
   a second high voltage blocking switch means interposed between said first current sink and an output control terminal of the switch to be controlled.

22. The telephone subscriber line circuit of claim 20 further comprising a control circuit comprising:
   a first control current source;
   a first control current sink;
   a second control current sink operatively connected to an input control terminal of the switch to be controlled and having a potential that is outside the limits of potential between said first current source and said first current sink; and
   a high voltage blocking switch means interposed between said first current sink and an output control terminal of the switch to be controlled.

23. An bidirectional switch comprising:
   two bipolar transistors with a first electrode of each connected together and a second electrode of each connected together and a third electrode of each connected to the switch terminals; and
   a biasing circuit comprising a non-linear current limiter coupled between said second electrodes.

24. The switch of claim 23 wherein said first electrodes are emitters and are resistively coupled;

wherein said current limiter comprises a diode and a resistor; and wherein said biasing circuit comprises either a single current source for both of said transistors or a separate current source for each of said two transistors.

25. A method of increasing switch gain in an analog signal switch having at least one bipolar junction transistor operating in the reverse direction and at least one bipolar junction transistor operating in the forward direction by the step of increasing the conduction inducing bias of said at least one transistor operating in the reverse direction relative to the conduction inducing bias of said at least one transistor operating in the forward direction.

26. The method of claim 25 wherein the relative increase in bias is achieved by diverting a portion of the conduction inducing current provided by a current source operatively connected to said at least one transistor operating in the forward direction from the base thereof to the base of said at least one transistor operating in the reverse direction as a function of either switch voltage or switch current; and wherein the diversion of current is accomplished by the limiting of current from the source to the base of said at least one transistor operating in the forward direction by diodes.

27. The method of claim 25 wherein the relative increase in conduction inducing bias is achieved by diverting a portion of the current through the switch from the emitter of said at least one transistor operating in the forward direction to the base of said at least one transistor operating in the reverse direction.

28. A method of increasing the range of linearity of an analog signal switch having at least one bipolar junction transistor operating in the reverse direction and at least one bipolar junction transistor operating in the forward direction by the step of increasing the conduction inducing bias of said at least one transistor operating in the reverse direction relative to the conduction inducing bias of said at least one transistor operating in the forward direction.

29. The method of claim 28 wherein the increase in range is achieved by diverting a portion of the current through the switch from the emitter of said at least one forward operating transistor to the base of said at least one reverse operating transistor by one or more of:

a) applying a larger portion of current from a single bias-supplying current source to the base of said at least one transistor operating in the reverse direction than to the base of said at least one transistor operating in the forward direction; and b) by the unequal application of current from two or more current sources to the bases of two of said transistors.

30. A method of reducing voice signal distortion in a telephone subscriber line circuit having a voice signal switch capable of withstanding the applications of ring voltage with the switch including at least two emitter coupled, bipolar junction transistors, at least one of the transistors operating in the forward direction and at least one of transistors operating in the reverse direction, comprising the step of increasing the conduction inducing bias of said at least one transistor operating in the reverse direction relative to the conduction inducing bias of said at least one transistor operating in the forward direction, thereby increasing the range of linearity of the switch and reducing distortion of the voice signal passing therethrough.

31. An analog switch comprising:

two bipolar junction transistors and a biasing circuit said biasing circuit comprising:

a single source of current and current limiting means for differentially controlling the conduction of said two transistors;

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

32. An analog signal switch comprising:

two bipolar junction transistors; and a biasing circuit, said biasing circuit comprising:

a first control current source;

a first control current sink;

a second control current sink operatively connected to an input terminal of the switch to be controlled and having a potential that is outside the limits of potential between first current source and said first current sink; and a high voltage blocking switch means interposed between said first current sink and an output control terminal of the switch to be controlled.

33. An analog signal switch comprising:

two bipolar transistors each having a first electrode connected to a switch terminal and resistively coupled second electrodes; and a biasing circuit including a current source for each of said transistors and unidirectional means between the second electrode of each of said transistors and the base of the other of said transistors.

34. The analog signal switch of claim 33 wherein said biasing circuit comprises:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

35. The analog signal switch of claim 33 wherein said biasing circuit comprises:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

36. A variable resistor comprising:

first, second and third transistors, the bases of all three of said transistors being common, the emitters of said first and second transistors being common, the collectors of said first and third transistors being common and operatively connected as one terminal of the resistor, the collector of said second transistor and the emitter of said third transistor being common and operatively connected as the other terminal of the resistor; and a current source operatively connected to said common bases and to the emitters of said first and second transistors to vary the value of the resistor.

37. An integrated circuit comprising:

a dielectrically isolated island having first and second regions of a first conductivity type semiconductor electrically isolated from each other by a third region of the other conductivity type semiconductor;

means operatively attached to said first and second regions as terminals of the circuit; and, means operatively attached to said third region having first and second opposite semiconductor type contacts as the control terminals of the circuit.

38. The integrated circuit of claim 37 further comprising a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

39. The integrated circuit of claim 37 further comprising a control circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

40. An integrated circuit comprising:

a semiconductor having three transistors therein the bases of all three of said transistors being common, the emitters of two of said transistors being common, the collectors of two of said transistors being common, and the emitters of two of said transistors being connected through the emitter collector of the third of said transistors;

terminals operatively connected to said two common collectors and the collector of said third transistor as the output terminals of the circuit; and terminals operatively connected to said three common bases and to said two common emitters as the control terminals of the circuit.

41. An integrated circuit comprising:

a dielectrically isolated island having first, second, third, fourth and fifth transistors therein, the bases of said first, second and third transistors being common with the collectors of said fourth and fifth transistors, the emitters of said first and second transistors being common, the collectors of said first and third transistors being common with the base of said fourth transistor, and the collector of said second transistor, the emitter of said third transistor and the base of said fifth transistor being common.

42. The integrated circuit of claim 41 including input/output terminals connected one each to the bases of said fourth and fifth transistors;

including control terminals connected one each to the emitters of said fourth and fifth transistors; and including a current source responsive to the voltage applied to said input/output terminals.

43. A method of increasing the gain of a bidirectional switch cell having two switch terminals comprising the steps of:

(a) providing first and second switches, each having first, second and third bipolar junction transistors with each of said first and second transistors having common emitters and the bases of all three said transistors being common, with each of the transistors in said first switch having an. NPN configuration and with each of the transistors in said second switch having a PNP configuration;

(b) connecting said first and second switches in parallel between the two switch terminals so that the collectors of said first transistors of each of said first and second switches are connected to one of said two switch terminals and the collectors of said second transistors of each of said first and second switches are connected to the other of said two switch terminals; and (c) controlling the operation said first and second switches with a single current source connected between the common bases of the transistors of said first switch and the common bases of the transistors of said second switch.

44. A integrated circuit comprising:

a semiconductor having five transistors therein, the bases of three of said transistors being common with the collectors of the remaining two of said transistors, the emitters of two of said transistors being common, the collectors of two of said transistors being common with the base of another of said transistor, and the emitter of one transistor, the collector of a second transistor and the base of a third transistor being common.

45. The integrated circuit of claim 44 further comprising a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

46. The integrated circuit of claim 44 further comprising a control circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

47. A control circuit for a current controlled, high voltage, analog switch having two switch terminals with a current path therebetween and at least one input control terminal and at least one output control terminal for routing a control current through a portion of the current path between the two switch terminals, the circuit comprising:

a first control current source;

a first high voltage blocking switch means interposed between said first current source and the input control terminals of the switch to be controlled;

a first control current sink; and a second high voltage blocking switch means interposed between said first current sink and the output control terminal of the switch to be controlled.

48. The circuit of claim 47 wherein the switch to be controlled includes a pair of common emitter BJTs having their collectors operatively connected one each to the input and output control terminals of the switch;

including a third BJT with the emitter-collector thereof connected between the input and output control terminals;

wherein the bases of all three of said BJTs are connected to said first blocking switch means through diodes, the bases of said pair of BJTs being separately connected to said first blocking switch means through the emitter-collector of a fourth and fifth BJT, the bases of each of said fourth and fifth BJTs being connected to one of said input and output control terminals; and wherein the emitters of two of said BJTs are connected to said second blocking switch means.

49. A control circuit for a current controlled, high voltage, analog switch having two input control terminals and two output control terminals comprising:

a first current source having two output terminals;

first and second high voltage silicon controlled rectifiers interposed one each between an output terminal of said first current source and an input control terminal of the switch to be controlled;

a first current sink having two input terminals; and first and second high voltage diodes interposed one each between an input terminal of said first current sink and an output control terminal of the switch to be controlled.

50. In the operation of a high voltage, current controlled, analog switch in its non-conducting condition, a current source for controlling the switch through input and output control terminals having a method of protecting the current source from an electrical potential applied to the switch, which potential is within the operating range of a circuit in which the switch is used but outside the operating range of the switch, the method comprising the step of connecting responsively to the switch being placed in its non-conducting condition the input control terminals of the switch to a current sink having the capacity to drain at least as much current as can be supplied by a potential within the operating range of the circuit.

51. A control circuit for a current controlled, high voltage, analog switch having two switch terminals with a current path therebetween and at least one input control terminal and at least one output control terminal for routing a control current through a portion of the current path between the two switch terminals, the circuit comprising:

a first control current source;

a first control current sink;

a second control current sink operatively connected to the input control terminal of the switch to be controlled and having a potential that is outside the limits of potential between said first current source and said first current sink; and a high voltage blocking switch means interposed between said first current sink and the output control terminal of the switch to be controlled.

52. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, each of said switches comprising: two bipolar junction transistors; and a biasing circuit, said biasing circuit including a single source of current and current limiting means for differentially controlling the conduction of said two transistors, said biasing circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

53. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, each of said switches comprising: two bipolar junction transistors; and a biasing circuit, said biasing circuit including a single source of current and current limiting means for differentially controlling the conduction of said two transistors, said biasing circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

54. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, each of said switches comprising:

two bipolar transistors each having a first electrode connected to a switch terminal and resistively coupled second electrodes, and a biasing circuit including a current source for each of said transistors and unidirectional means between the second electrode of each of said transistors and the base of the other of said transistors.

55. The telephone subscriber line circuit of claim 54 wherein said biasing circuit comprises:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

56. The telephone subscriber line circuit of claim 54 wherein said biasing circuit comprises:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

57. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, each of said switches being an integrated circuit comprising:

a dielectrically isolated island having first and second regions of a first conductivity type semiconductor electrically isolated from each other by a third region of the other conductivity type semiconductor;

means operatively attached to said first and second regions as terminals of the circuit; and, means operatively attached to said third region having first and second opposite semiconductor type contacts as the control terminals of the circuit.

58. The telephone subscriber line circuit of claim 57 further comprising a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

59. The telephone subscriber line circuit of claim 57 further comprising a control circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

60. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, each of said switches being an integrated circuit comprising:

first, second and third transistors;

the bases of all three of said transistors being common; and the emitters of said first and second transistors being common.

61. The telephone subscriber line circuit of claim 60 further comprising a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

62. The telephone subscriber line circuit of claim 60 further comprising a control circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

63. In a telephone subscriber line circuit for relaying audio signals from a digital switch matrix and ring signal to a subscriber wire pair having plural relays for plural functions including at least one of ringing, test access, ground start, message waiting, cutoff and reversal, the improvement wherein at least one of said plurality relays comprises a plurality of switches each having two switch terminal with a current path therebetween and at least one input control terminal and at least one output control terminal for routing a control current through a portion of the current path between said two switch terminals to thereby control the operation of said switch, each of said switches being an integrated circuit comprising:
      a semiconductor having five transistors therein,
      the bases of three of said transistors being common with the collectors of the remaining two of said transistors,
      the emitters of two of said transistors being common,
      the collectors of two of said transistors being common with the base of another transistor, and
      the emitter of one transistor, the collector of a second transistor and the base of a third transistor being common.

64. The telephone subscriber line circuit of claim 63 further comprising a control circuit comprising:
   a first control current source;
   a first high voltage blocking switch means interposed between said first current source and an input control terminal of the switch to be controlled;
   a first control current sink; and
   a second high voltage blocking switch means interposed between said first current sink and an output control terminal of the switch to be controlled.

65. The telephone subscriber line circuit of claim 63 further comprising a control circuit comprising:
   a first control current source;
   a first control current sink;
   a second control current sink operatively connected to an input control terminal of the switch to be controlled and having a potential that is outside the limits of potential between said first current source and said first current sink; and
   a high voltage blocking switch means interposed between said first current sink and an output control terminal of the switch to be controlled.

66. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, said plurality of switches being analog high voltage switches,
   each of said switches being an integrated circuit comprising:
      a dielectrically isolated island having first and second regions of a first conductivity type semiconductor electrically isolated from each other by a third region of the other conductivity type semiconductor;
      means operatively attached to said first and second regions as terminals of the circuit; and,
      means operatively attached to said third region having first and second opposite semiconductor type contacts as the control terminals of the circuit.

67. The integrated circuit of claim 66 further comprising a control circuit comprising:
   a first control current source;
   a first high voltage blocking switch means interposed between said first current source and an input control terminal of the switch to be controlled;
   a first control current sink; and
   a second high voltage blocking switch means interposed between said first current sink and an output control terminal of the switch to be controlled.

68. The integrated circuit of claim 66 further comprising a control circuit comprising:
   a first control current source;
   a first control current sink;
   a second control current sink operatively connected to an input control terminal of the switch to be controlled and having a potential that is outside the limits of potential between said first current source and said first current sink; and
   a high voltage blocking switch means interposed between said first current sink and an output control terminal of the switch to be controlled.

69. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, said plurality of switches are analog, high voltage switches,
   each of said switches being an integrated circuit comprising:
      first, second and third transistors;
      the bases of all three of said transistors being common;
      and the emitters of said first and second transistors being common.

70. The integrated circuit of claim 69 further comprising a control circuit comprising:
   a first control current source;
   a first high voltage blocking switch means interposed between said first current source and an input control terminal of the switch to be controlled;
   a first control current sink; and
   a second high voltage blocking switch means interposed between said first current sink and an output control terminal of the switch to be controlled.

71. The integrated circuit of claim 69 further comprising a control circuit comprising:
   a first control current source;
   a first control current sink;
   a second control current sink operatively connected to an input control terminal of the switch to be controlled and having a potential that is outside the limits of potential between said first current source and said first current sink; and
   a high voltage blocking switch means interposed between said first current sink and an output control terminal of the switch to be controlled.

72. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, said plurality of switches being analog, high voltage switches, each of said switches being an integrated circuit comprising:

a semiconductor having five transistors therein, the bases of three of said transistors being common with the collectors of the remaining two of said transistors, the emitters of two of said transistors being common, the collectors of two of said transistors being common with the base of another transistor, and the emitter of one transistor, the collector of a second transistor and the base of a third transistor being common.

73. The integrated circuit of claim 72 further comprising a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

74. The integrated circuit of claim 72 further comprising a control circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

75. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current path between said two switch terminals to thereby control the operation of said switch, said plurality of switches being bidirectional with zero offset, each of said switches being an integrated circuit comprising:

a dielectrically isolated island having first and second regions of a first conductivity type semiconductor electrically isolated from each other by a third region of the other conductivity type semiconductor;

means operatively attached to said first and second regions as terminals of the circuit; and, means operatively attached to said third region having first and second opposite semiconductor type contacts as the control terminals of the circuit.

76. The integrated circuit of claim 75 further comprising a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

77. The integrated circuit of claim 75 further comprising a control circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

78. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and at least one input control terminal and at least one output control terminal for routing a control current through a portion of the current oath between said two switch terminals to thereby control the operation of said switch, said plurality of switches being bidirectional with zero offset, each of said switches being an integrated circuit comprising:

first, second and third transistors;

the bases of all three of said transistors being common; and the emitters of said first and second transistors being common.

79. The integrated circuit of claim 78 further comprising a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

80. The integrated circuit of claim 78 further comprising a control circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

81. In a telephone subscriber line circuit for relaying audio signals from a digital switch matrix and ring signals to a subscriber wire pair having plural relays for various functions including at least two of ringing, test access, ground start, message waiting, cutoff and for reversal, the improvement wherein at least one of said plural relays comprises a plurality of switches each having two switch terminals with a current path therebetween and least one input control terminal and at least one output control terminal for routing a control current through a portion of the current path between said two switch terminals to thereby control the operation of said switch, said plurality of switches being bidirectional with zero offset, each of said switches being an integrated circuit comprising:

a semiconductor having five transistors therein, the bases of three of said transistors being common with the collectors of the remaining two of said transistors the emitters of two of said transistors being common, the collectors of two of said transistors being common with the base of another transistor, and the emitter of one transistor, the collector of a second transistor and the base of a third transistor being common.

82. The integrated circuit of claim 81 further comprising a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

83. The integrated circuit of claim 81 further comprising a control circuit comprising:

a first control current source;

a first control current sink;

a second control current sink operatively connected to an input control terminal of the switch to be controlled and having a potential that is outside the limits of potential between said first current source and said first current sink; and a high voltage blocking switch means interposed between said first current sink and an output control terminal of the switch to be controlled.

84. An integrated circuit comprising:

a semiconductor having three transistors therein, the bases of all three of said transistors being common and the emitters of two of said transistors being common; and a control circuit comprising:

a first control current source;

a first high voltage blocking switch means interposed between said first current source and an input control terminal of the switch to be controlled;

a first control current sink; and a second high voltage blocking switch means interposed between said first current sink and an output control terminal of the switch to be controlled.

85. An integrated circuit comprising;

a semiconductor having three transistors therein the bases of all thereof said transistors being common and the emitters of two of said transistors being common; and a control circuit comprising:

a first control current source;

a first control current sink;

a second control current oink operatively connected to an input control terminal of the switch to be controlled and having a potential that is outside the limits of potential between said first current source and said first current sink; and a high voltage blocking switch means interposed between said first current sink and an output control terminal of the switch to be controlled.

* * * * *